(12) United States Patent
Higuchi et al.

(10) Patent No.: US 8,885,888 B2
(45) Date of Patent: Nov. 11, 2014

(54) IN-VEHICLE APPARATUS FOR RECOGNIZING RUNNING ENVIRONMENT OF VEHICLE

(75) Inventors: Mirai Higuchi, Hitachi (JP); Yuji Otsuka, Hitachinaka (JP); Takeshi Shima, Pittsburgh, PA (US); Kimiyoshi Machii, Novi, MI (US); Shoji Muramatsu, Hitachinaka (JP); Kota Irie, Hitachinaka (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 13/474,750

(22) Filed: May 18, 2012

(65) Prior Publication Data

US 2012/0224747 A1    Sep. 6, 2012

Related U.S. Application Data

(63) Continuation of application No. 12/018,649, filed on Jan. 23, 2008, now Pat. No. 8,204,276.

(30) Foreign Application Priority Data

Feb. 13, 2007    (JP) .................................. 2007-031535

(51) Int. Cl.
  *G06K 9/00*    (2006.01)
  *G08G 1/16*    (2006.01)
(52) U.S. Cl.
  CPC .............. *G08G 1/16* (2013.01); *G06K 9/00791* (2013.01); *G08G 1/167* (2013.01)
  USPC ............................ 382/104; 382/100; 382/325

(58) Field of Classification Search
  USPC .................. 382/104, 105; 348/113, 116, 118; 340/937
  See application file for complete search history.

(56) References Cited

U.S. PATENT DOCUMENTS

| 5,521,579 | A  | 5/1996  | Bernhard |
| 5,835,028 | A  | 11/1998 | Bender et al. |
| 6,138,062 | A  | 10/2000 | Usami |
| 6,226,592 | B1 | 5/2001  | Luckscheiter et al. |
| 6,292,111 | B1 | 9/2001  | Ishikawa et al. |

(Continued)

FOREIGN PATENT DOCUMENTS

JP    5-205196    8/1993

OTHER PUBLICATIONS

European Search Report dated Sep. 21, 2009.

*Primary Examiner* — Aaron W Carter
(74) *Attorney, Agent, or Firm* — Crowell & Moring LLP

(57) ABSTRACT

An in-vehicle running-environment recognition apparatus including an input unit for inputting an image signal from in-vehicle imaging devices for photographing external environment of a vehicle, an image processing unit for detecting a first image area by processing the image signal, the first image area having a factor which prevents recognition of the external environment, an image determination unit for determining a second image area based on at least any one of size of the first image area, position thereof, and set-up positions of the in-vehicle imaging devices having the first image area, an environment recognition processing being performed in the second image area, the first image area being detected by the image processing unit, and an environment recognition unit for recognizing the external environment of the vehicle based on the second image area.

8 Claims, 22 Drawing Sheets

(56) References Cited

U.S. PATENT DOCUMENTS

| | | |
|---|---|---|
| 6,737,963 B2 | 5/2004 | Gutta et al. |
| 7,603,215 B2 | 10/2009 | Matsumoto et al. |
| 8,204,276 B2 * | 6/2012 | Higuchi et al. ............... 382/104 |
| 2004/0164851 A1 | 8/2004 | Crawshaw |
| 2006/0184297 A1 | 8/2006 | Higgins-Luthman |
| 2008/0192984 A1 * | 8/2008 | Higuchi et al. ............... 382/104 |
| 2008/0255724 A1 * | 10/2008 | Fechner et al. ................ 701/35 |
| 2014/0049648 A1 * | 2/2014 | Stein et al. .................... 348/148 |

\* cited by examiner

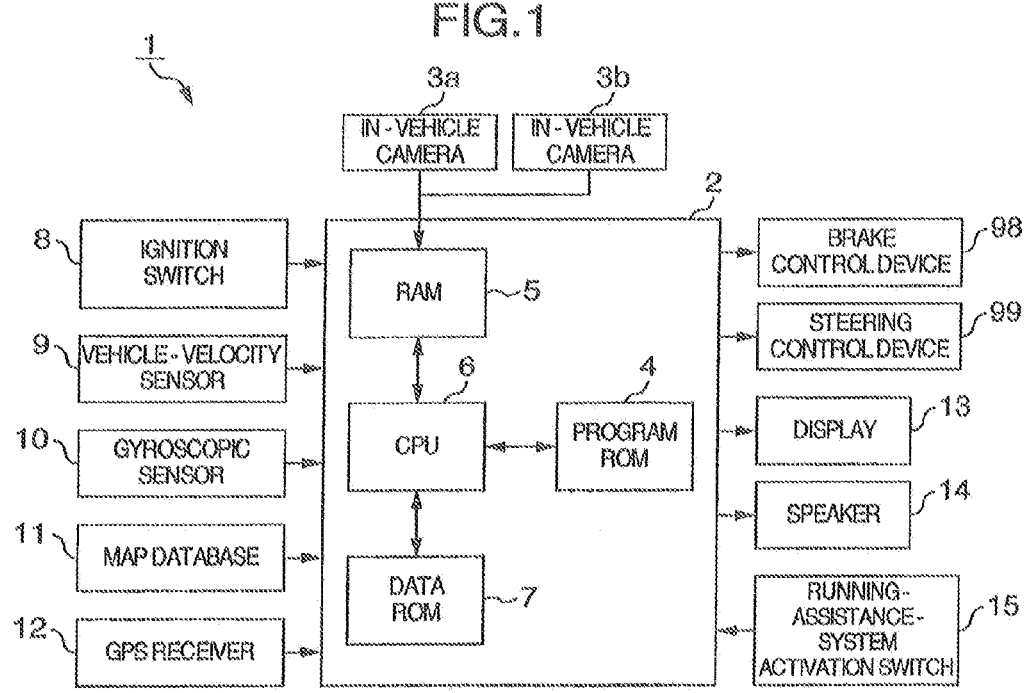
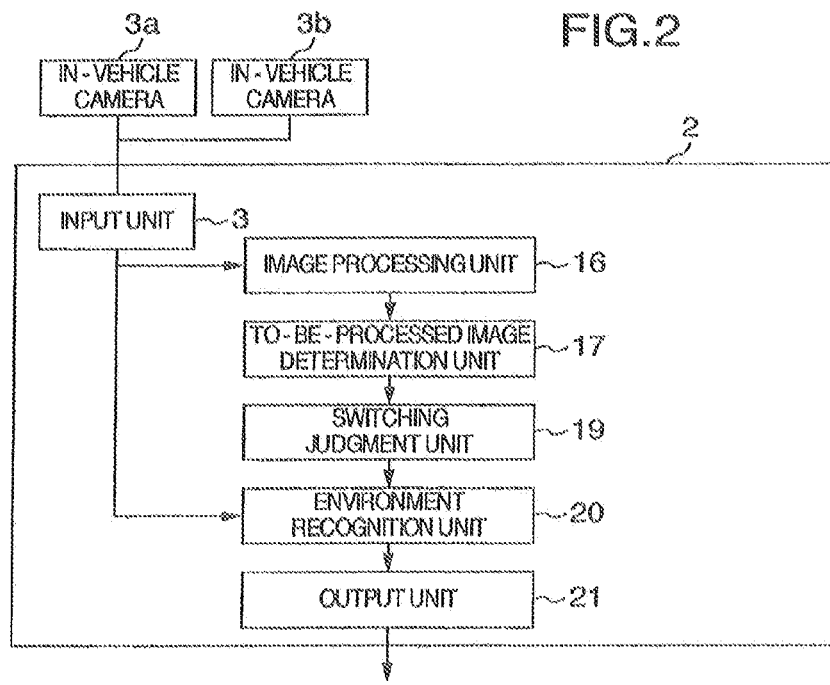

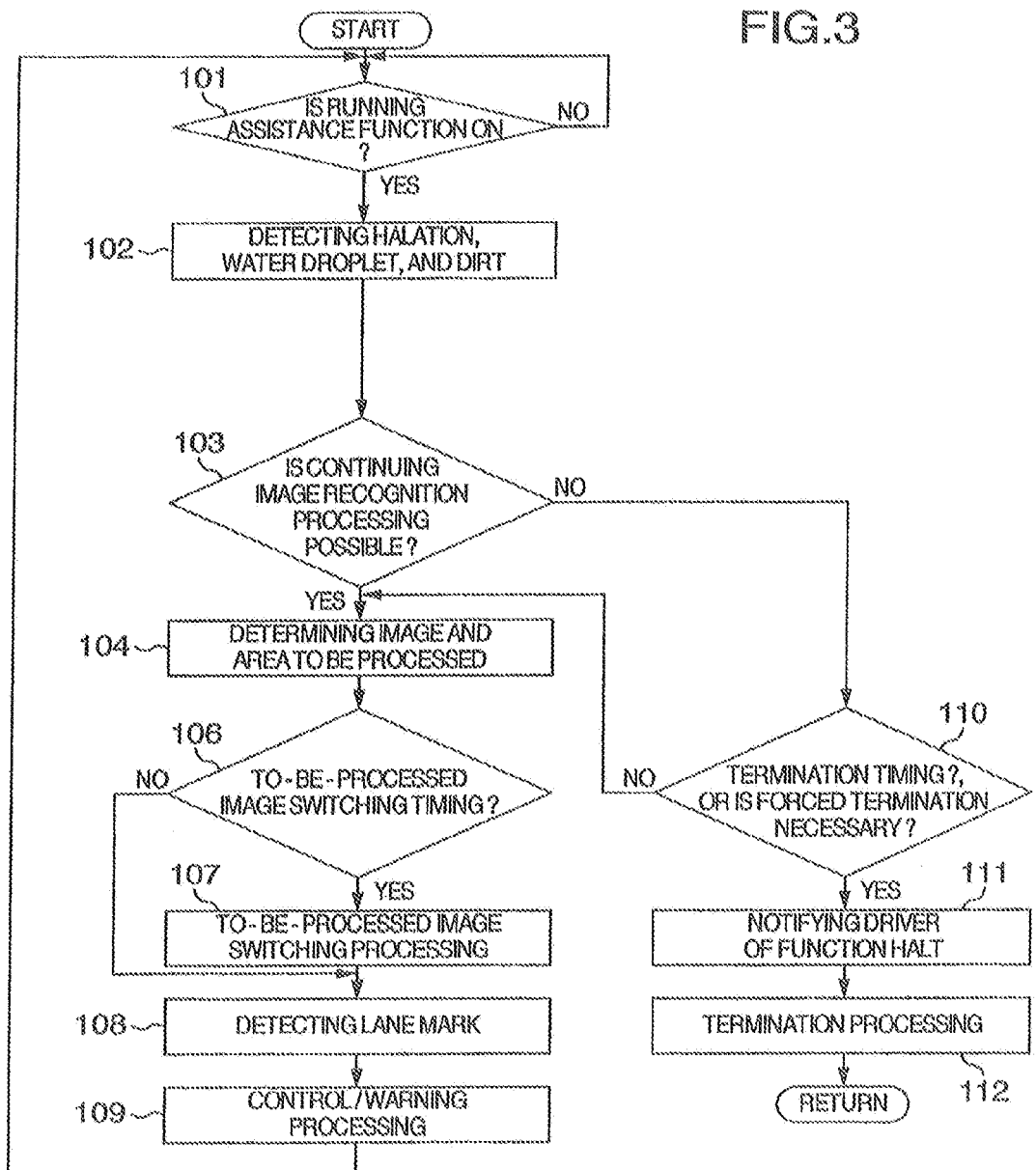

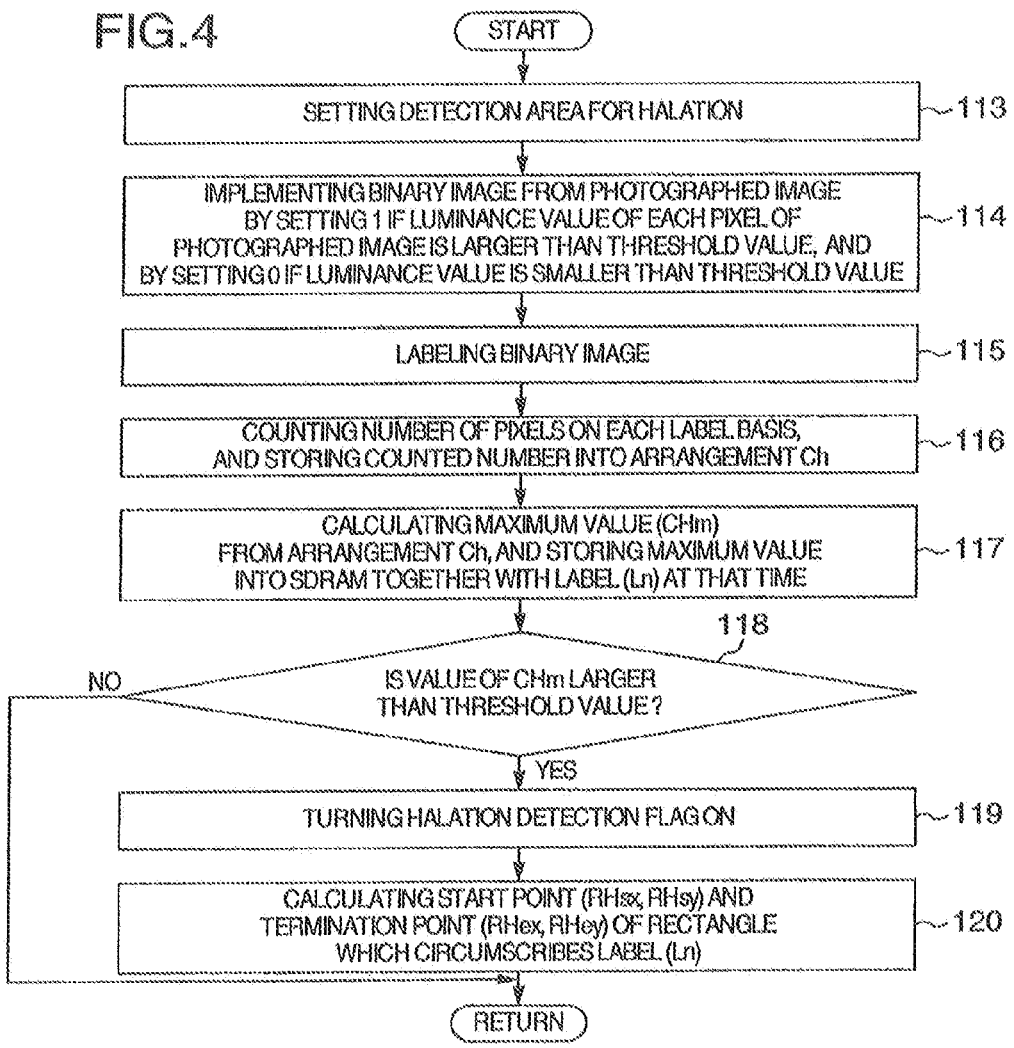
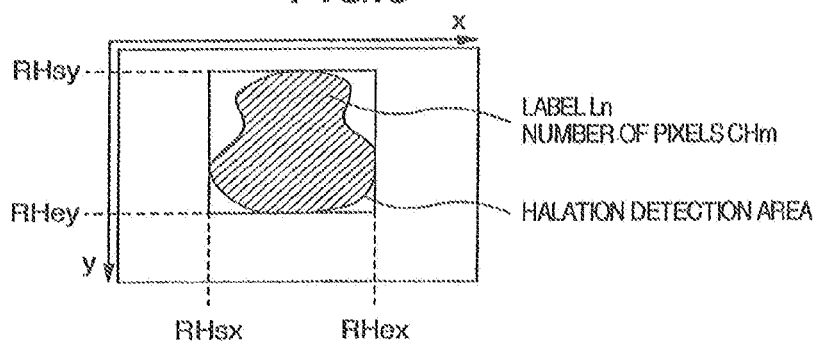

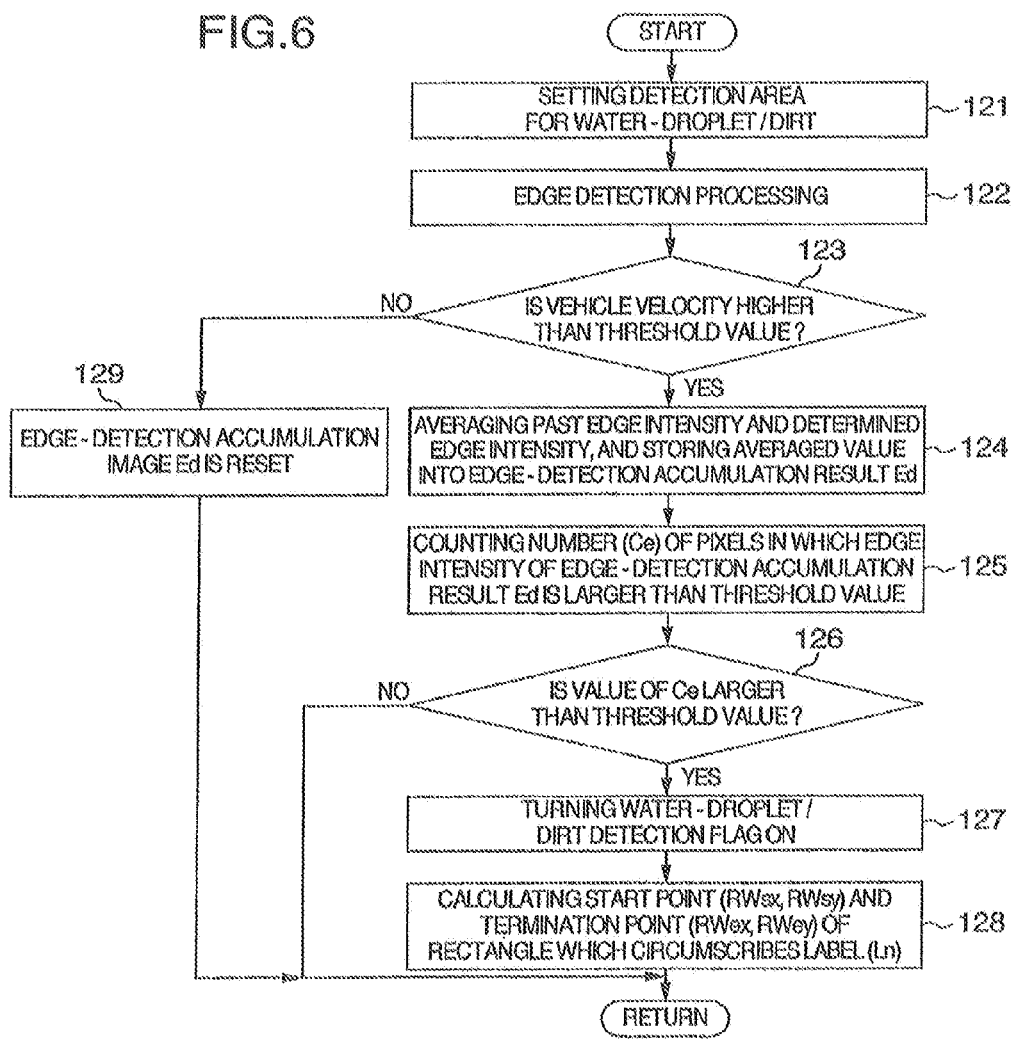
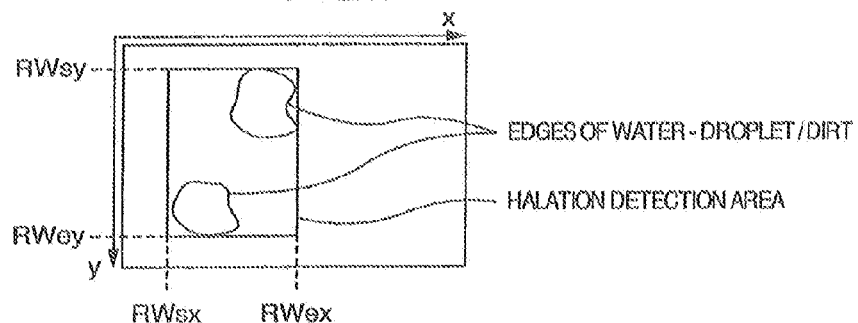

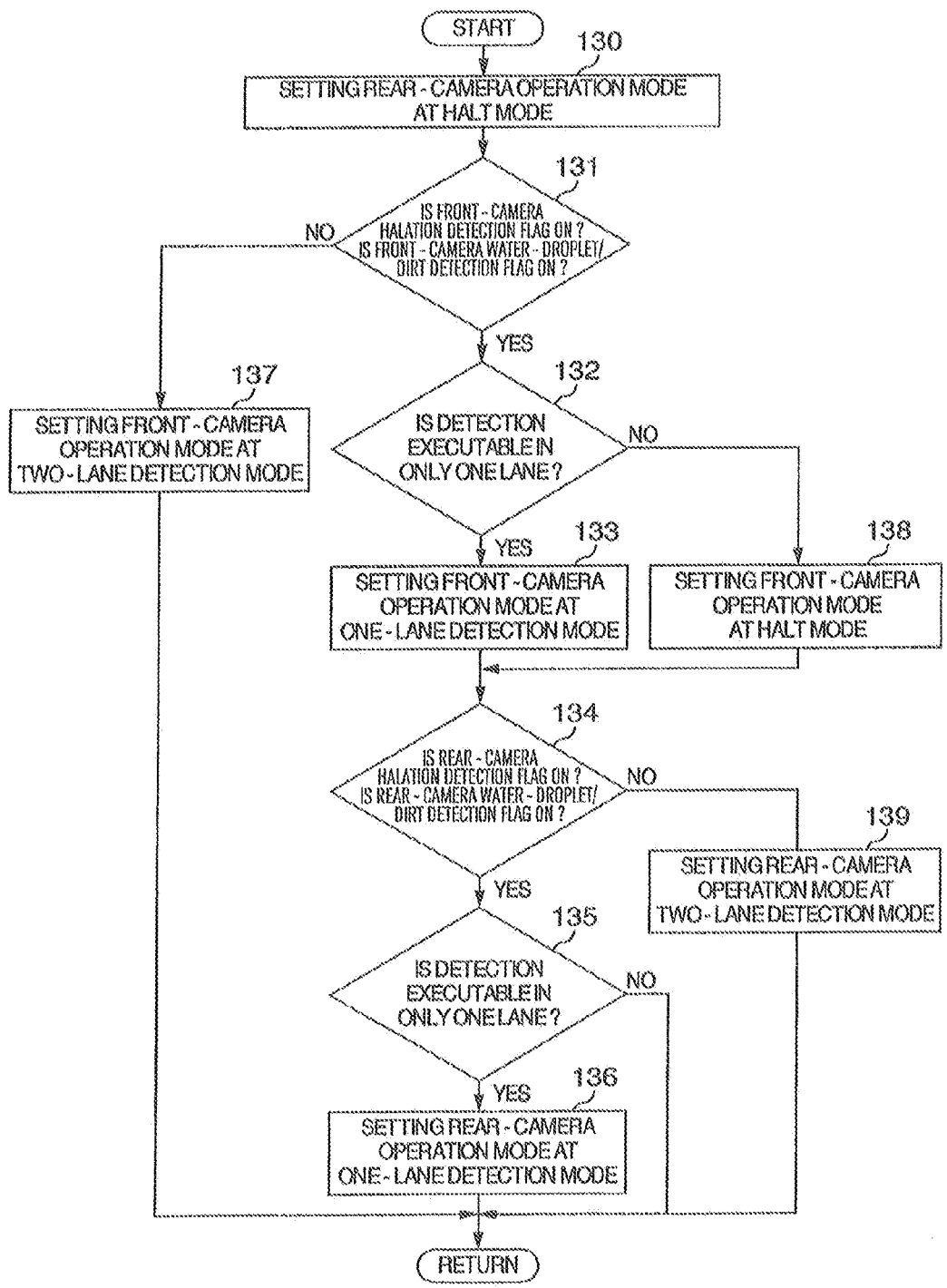

FIG.9
FRONT CAMERA : GOOD
REAR CAMERA : GOOD
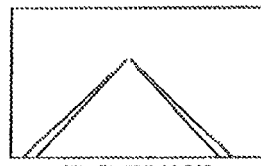
FRONT IMAGE
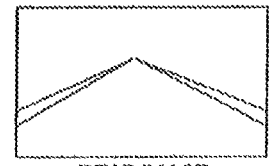
REAR IMAGE
FRONT CAMERA : HALATION
REAR CAMERA : GOOD
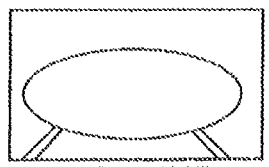
FRONT IMAGE
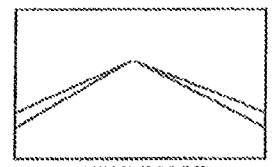
REAR IMAGE
FRONT CAMERA : HALATION AT RIGHT
OF IMAGE
REAR CAMERA : HALATION
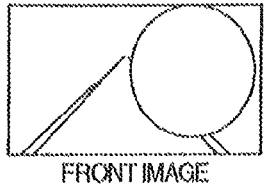
FRONT IMAGE
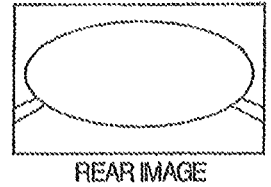
REAR IMAGE

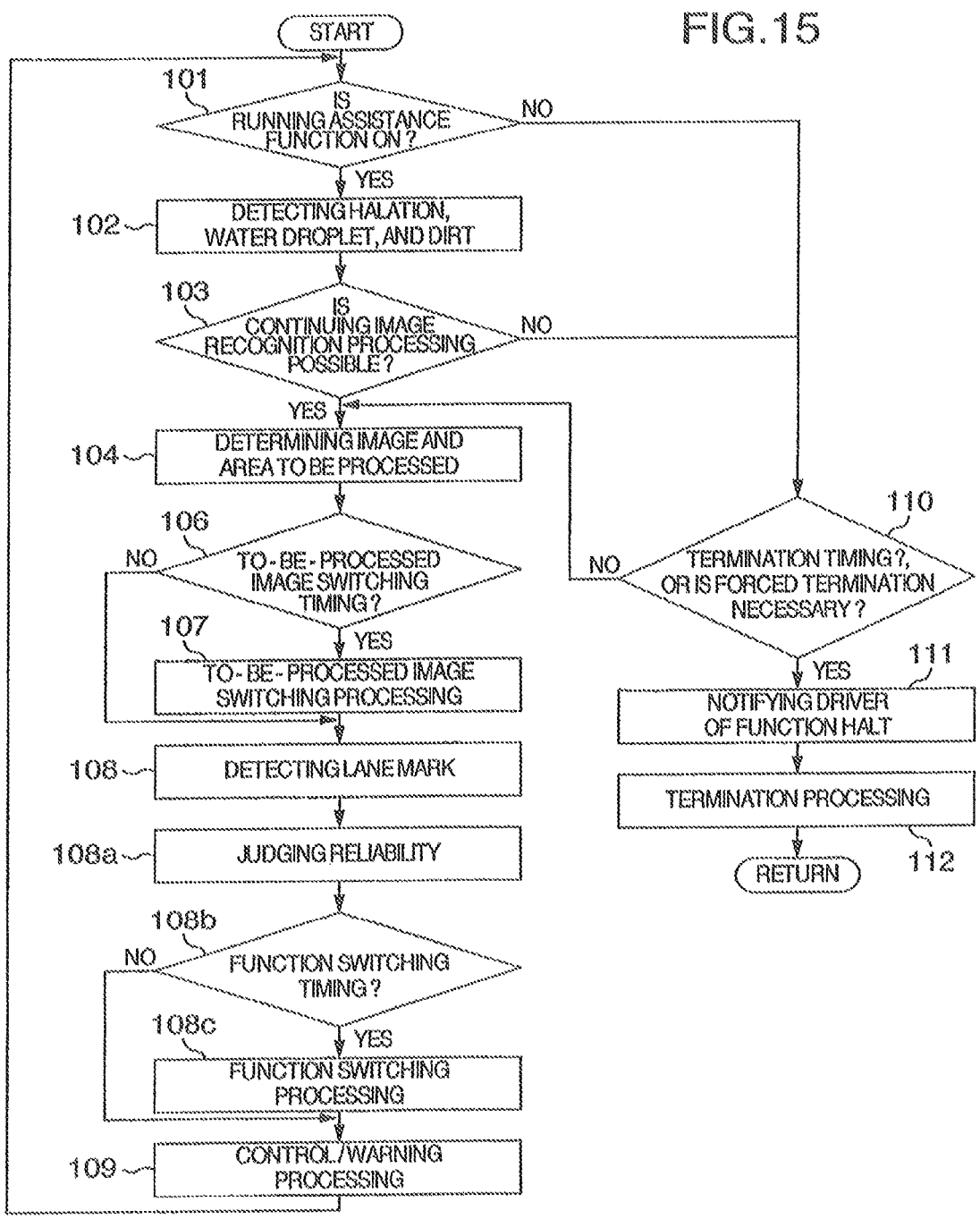

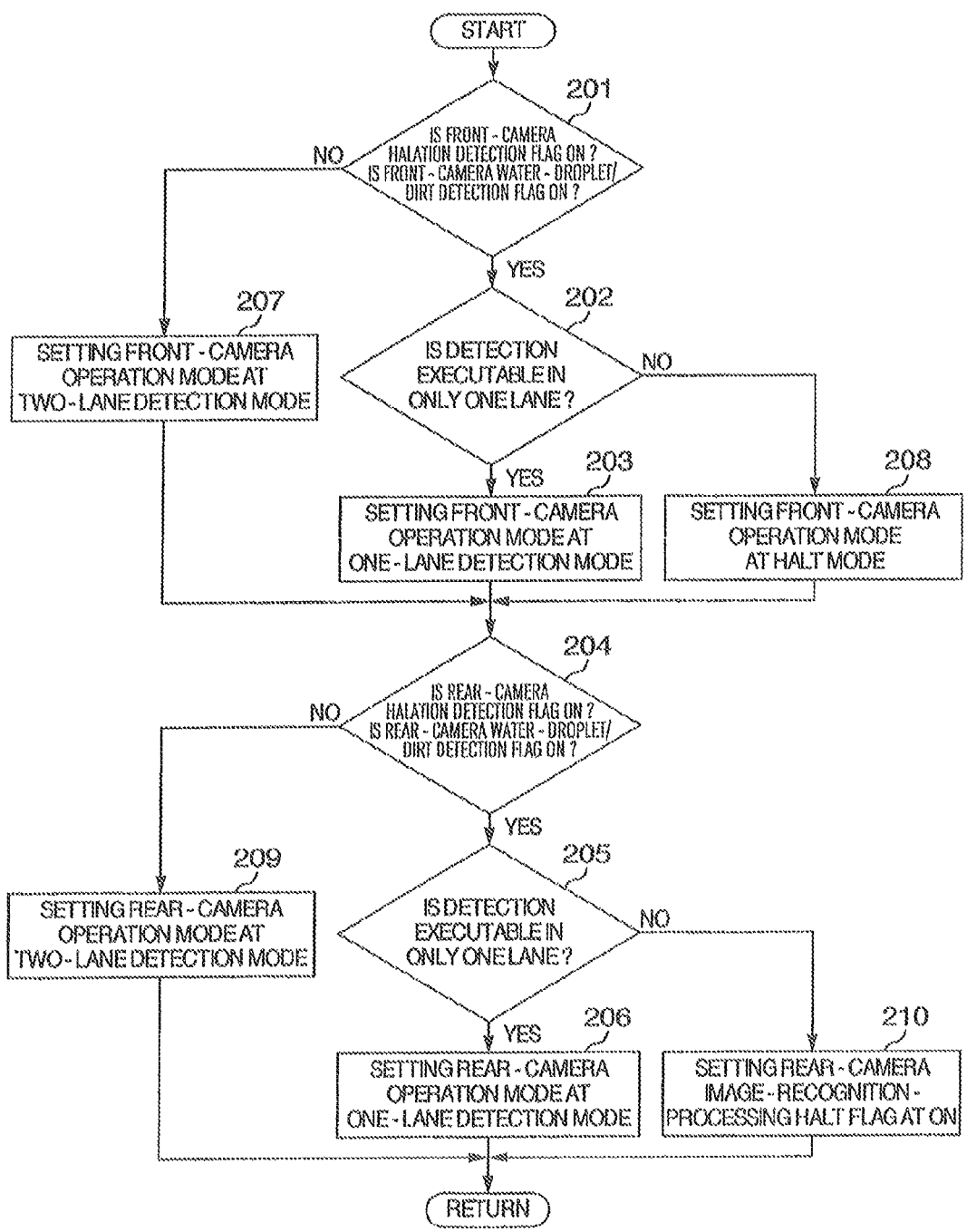

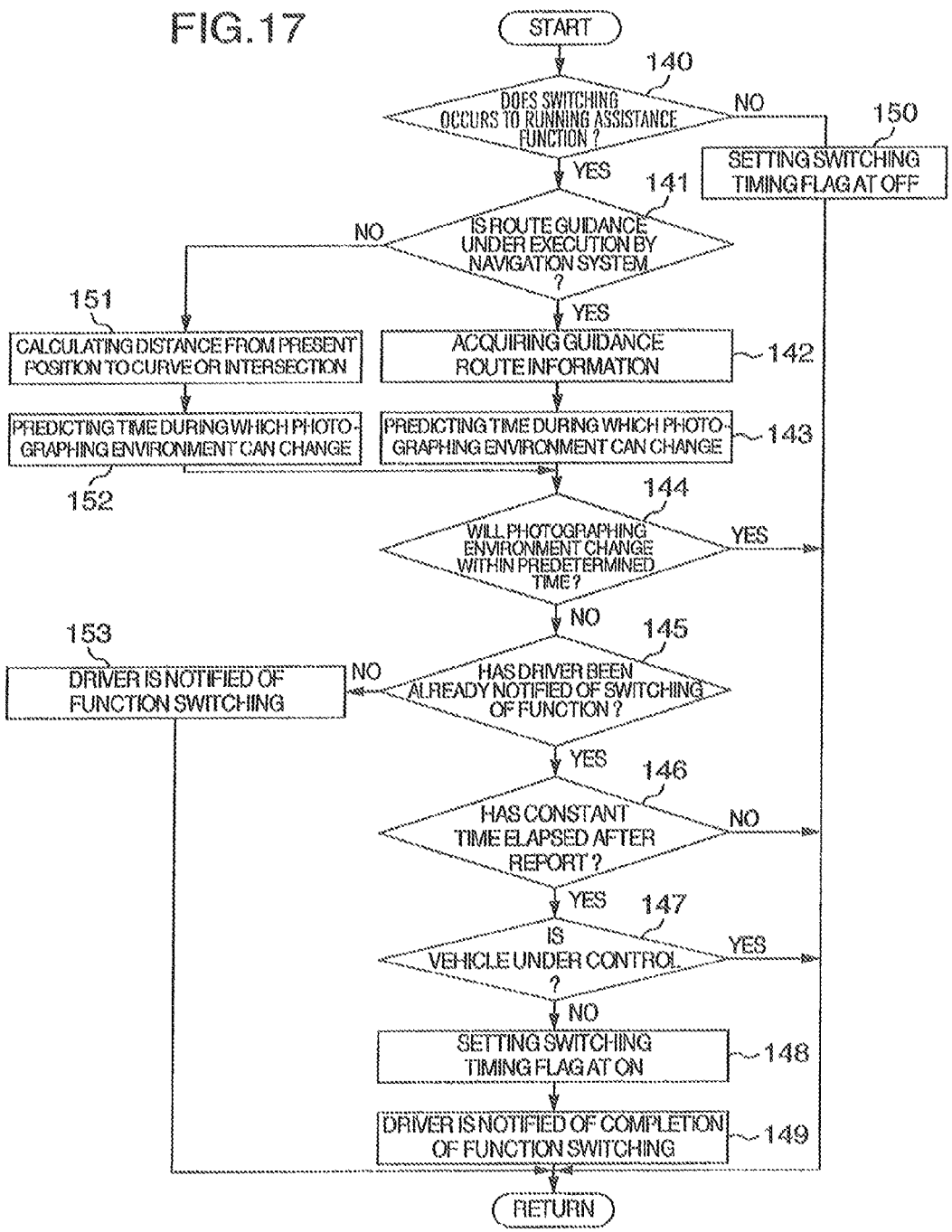

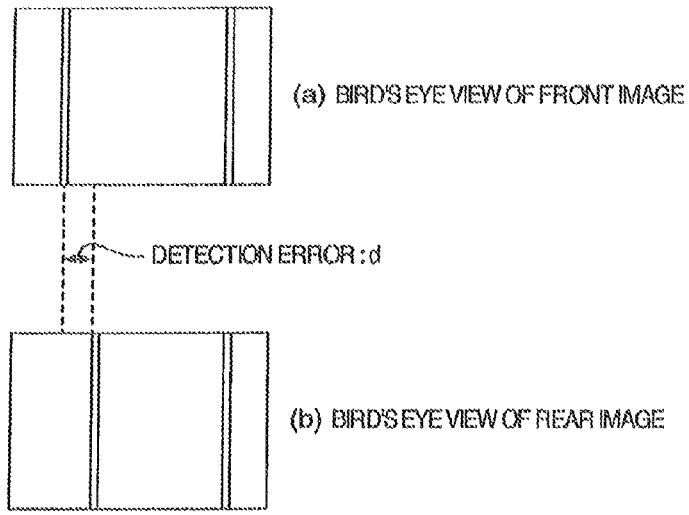

FIG.18

(a) BIRD'S EYE VIEW OF FRONT IMAGE

DETECTION ERROR : d (b) BIRD'S EYE VIEW OF REAR IMAGE

FIG.19

| FRONT CAMERA | REAR CAMERA | DRIVING ASSISTANCE FUNCTION |
|---|---|---|
| GOOD | Don't care | LANE KEEP OR LANE DEVIATION WARNING |
| ONLY ONE LANE IS DETECTABLE | GOOD | LANE DEVIATION WARNING |
| ONLY ONE LANE IS DETECTABLE | ONLY ONE LANE IS DETECTABLE | LOW - LEVEL LANE DEVIATION WARNING |
| ONLY ONE LANE IS DETECTABLE | IMAGE RECOGNITION PROCESSING IS IMPOSSIBLE | LOW - LEVEL LANE DEVIATION WARNING |
| IMAGE RECOGNITION PROCESSING IS IMPOSSIBLE | GOOD | LANE DEVIATION WARNING |
| IMAGE RECOGNITION PROCESSING IS IMPOSSIBLE | ONLY ONE LANE IS DETECTABLE | LOW - LEVEL LANE DEVIATION WARNING |
| IMAGE RECOGNITION PROCESSING IS IMPOSSIBLE | IMAGE RECOGNITION PROCESSING IS IMPOSSIBLE | DRIVING ASSISTANCE FUNCTION IS HALTED, RECOVERY - AWAITING STATE |

FIG.20

| FRONT CAMERA | DRIVING ASSISTANCE FUNCTION |
|---|---|
| GOOD | LANE KEEP OR LANE DEVIATION WARNING |
| ONLY ONE LANE IS DETECTABLE | LOW - LEVEL LANE DEVIATION WARNING |

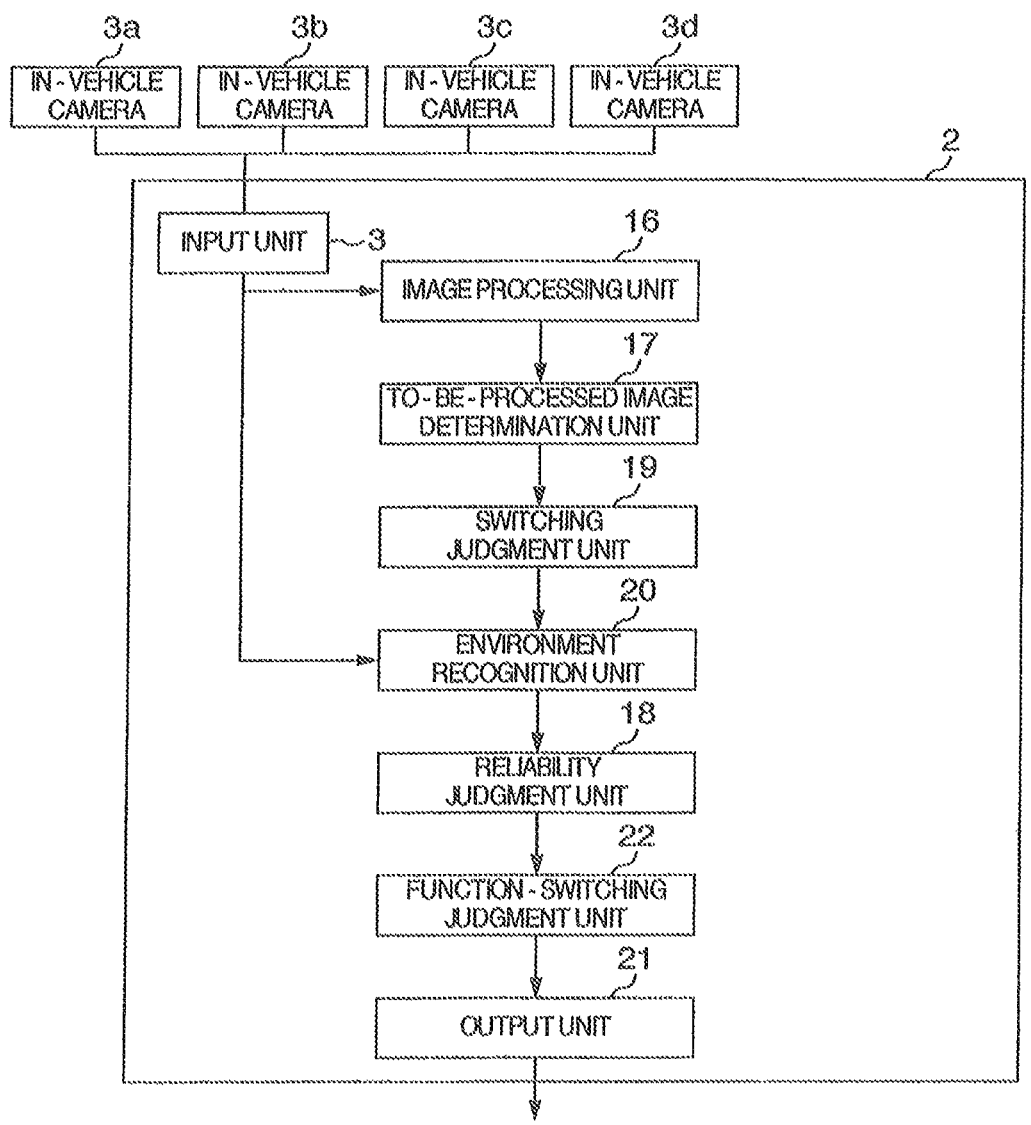

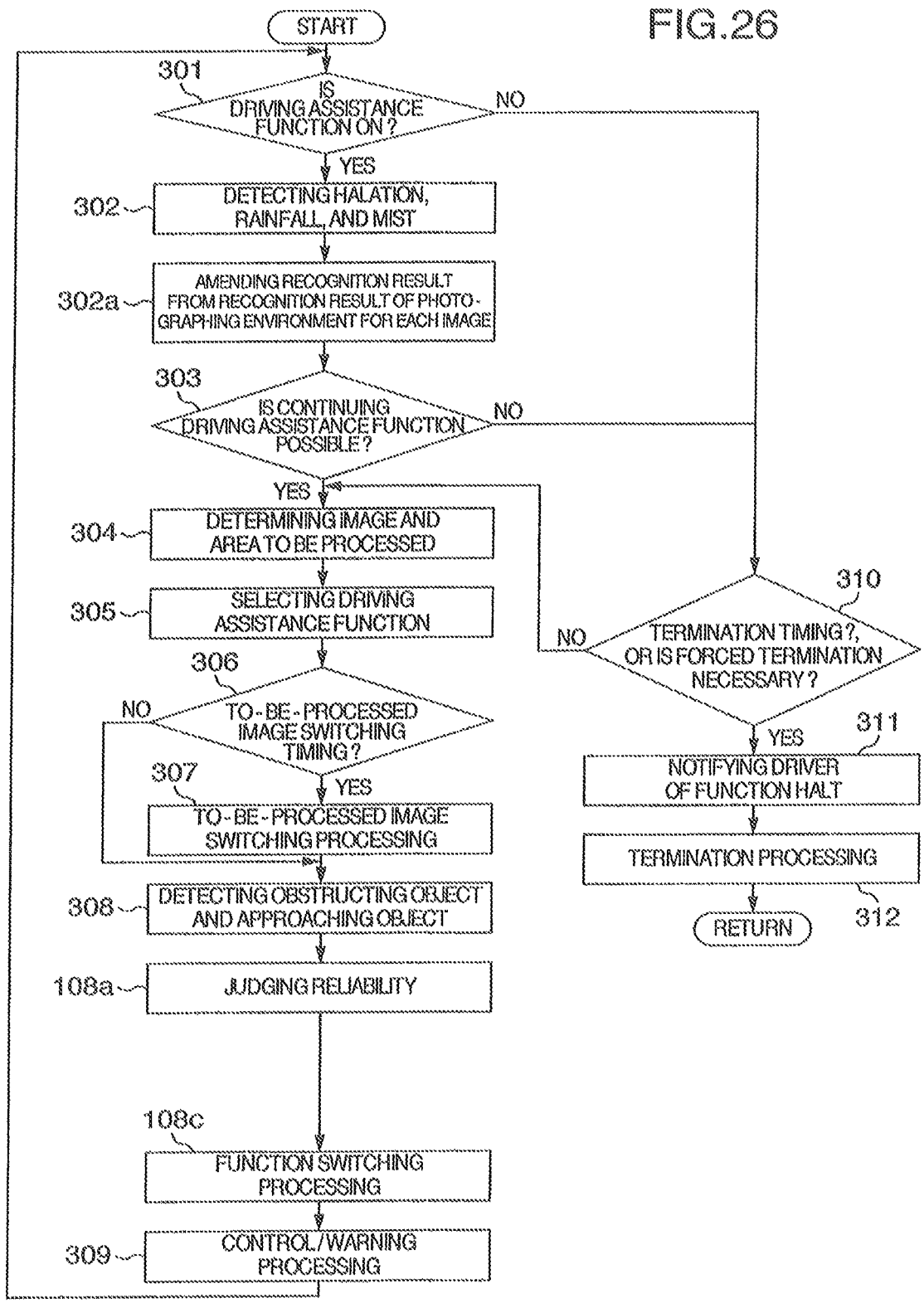

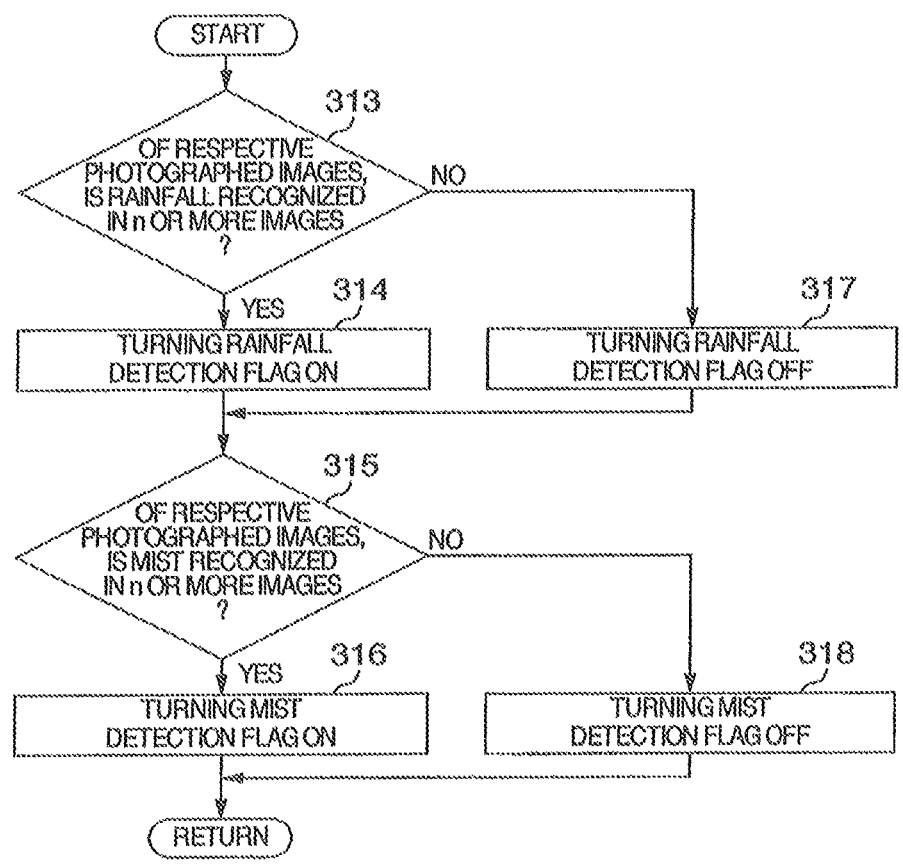

FIG.28

| FRONT CAMERA | SIDE CAMERA | REAR CAMERA | DRIVING ASSISTANCE FUNCTION |
|---|---|---|---|
| GOOD | GOOD | GOOD | STEERING CONTROL, BRAKE ASSISTANCE |
| GOOD | IMAGE RECOGNITION PROCESSING IS IMPOSSIBLE | GOOD | BRAKE ASSISTANCE |
| GOOD | IMAGE RECOGNITION PROCESSING IS IMPOSSIBLE | IMAGE RECOGNITION PROCESSING IS IMPOSSIBLE | WARNING FOR FORWARD APPROACHING OBJECT |
| GOOD | GOOD | IMAGE RECOGNITION PROCESSING IS IMPOSSIBLE | WARNING FOR FORWARD / SIDE APPROACHING OBJECT |
| IMAGE RECOGNITION PROCESSING IS IMPOSSIBLE | GOOD | GOOD | WARNING FOR SIDE / BACKWARD APPROACHING OBJECT |
| IMAGE RECOGNITION PROCESSING IS IMPOSSIBLE | IMAGE RECOGNITION PROCESSING IS IMPOSSIBLE | GOOD | WARNING FOR BACKWARD APPROACHING OBJECT |
| IMAGE RECOGNITION PROCESSING IS IMPOSSIBLE | GOOD | IMAGE RECOGNITION PROCESSING IS IMPOSSIBLE | WARNING FOR SIDE APPROACHING OBJECT |
| IMAGE RECOGNITION PROCESSING IS IMPOSSIBLE | IMAGE RECOGNITION PROCESSING IS IMPOSSIBLE | IMAGE RECOGNITION PROCESSING IS IMPOSSIBLE | SYSTEM IS HALTED, RECOVERY - AWAITING STATE |

IN-VEHICLE APPARATUS FOR RECOGNIZING RUNNING ENVIRONMENT OF VEHICLE

CROSS REFERENCE TO RELATED APPLICATIONS

This application is a continuation of U.S. patent application Ser. No. 12/018,649, filed Jan. 23, 2008, the entire disclosure of which is incorporated herein by reference, the priority of which is claimed, which claims priority under 35 U.S.C. §119 to Japanese Patent Application No. 2007-031535, filed Feb. 13, 2007, the priority of which is also claimed here.

BACKGROUND OF THE INVENTION

The present invention relates to technologies for processing images photographed by such devices as an in-vehicle camera.

In recent years, the development has been proceeding concerning the following technology: The external environment of a vehicle is recognized based on the images photographed by an imaging device mounted on the vehicle. Moreover, the automatic driving or driving assistance is performed based on the recognition result.

When detecting a target outside a vehicle by processing the images photographed by an imaging device, in some cases, the detection process cannot be appropriately performed due to influences exerted by such a cause as sunlight or other vehicle's headlight. As a solution for this problem, there has been known the following technology (refer to, e.g., JP-A-05-205196): One image input device is provided at each of the front and rear of the vehicle. Then, if contrast of an image photographed by the front-positioned image input device becomes lower, an image photographed by the rear-positioned image input device is selected. Moreover, based on this image information selected, the running route is recognized.

The causes for making the image recognition difficult are not limited to such a cause as sunlight or headlight. In some cases, depending on a cause concerned, the environment information is sufficiently obtainable without switching the image to be processed from the front view to the rear view. As a result, the image recognition is executable even in a situation where the image recognition was impossible conventionally. Also, in the irradiation with the sunlight or headlight, when no obstructing object exists in the surroundings, the irradiation continues in a time-interval which is longer than a certain constant one. However, when, in the evening, the vehicle is running between buildings, or when the headlight is directed at the vehicle by a vehicle coming from the opposite direction in such a place as an expressway having a central divider of hedge, a state where the vehicle is illuminated with the sunlight or headlight and a state where the vehicle is intercepted from the sunlight or headlight are repeated alternately in a short while. In a case like this, according to the above-described technology, it turns out that the image switching processing between the front view and the rear view is performed so frequently. As a result, there exists a possibility that the running environment cannot be satisfactorily recognized depending on a time needed for the image processing.

In view of the above-described problem, an object of the present invention is to provide an in-vehicle image recognition processing which exhibits a higher accuracy.

SUMMARY OF THE INVENTION

In the present invention, there is provided an in-vehicle running-environment recognition apparatus which detects a first image area, the first image area having a factor which prevents recognition of external environment of a vehicle, determines a second image area based on at least any one of size and position of the first image area, and set-up positions, in-vehicle imaging devices having the first image area being set up at the set-up positions, an environment recognition processing being to be performed in the second image area, and recognizes the external environment of the vehicle based on the second image area.

Also, in the present invention, there is provided an in-vehicle running-environment recognition apparatus which detects a first image area, the first image area having a factor which prevents recognition of external environment of a vehicle, switches an environment recognition method based on at least any one of size and position of the first image area, and set-up positions, in-vehicle imaging devices having the first image area being set up at the set-up positions, and recognizes the external environment of the vehicle based on the switched environment recognition method.

The present invention is capable of providing the in-vehicle image recognition processing which exhibits a higher accuracy.

Other objects, features and advantages of the invention will become apparent from the following description of the embodiments of the invention taken in conjunction with the accompanying drawings.

BRIEF DESCRIPTION OF THE DRAWINGS

FIG. 1 illustrates a block configuration diagram of an in-vehicle system 1 which embodies a first embodiment of the present invention;

FIG. 2 illustrates a functional block diagram of the running-environment recognition apparatus 2 in FIG. 1;

FIG. 3 illustrates a control flowchart by the running-environment recognition apparatus 2 in FIG. 1;

FIG. 4 illustrates a halation detection processing at a step 102 in FIG. 3;

FIG. 5 illustrates a halation detection area in the processing in FIG. 4;

FIG. 6 illustrates a detection processing of water droplet and dirt at the step 102 in FIG. 3;

FIG. 7 illustrates a detection area for the water droplet and dirt in the processing in FIG. 6;

FIG. 8 illustrates processing contents at a step 104 in FIG. 3;

FIG. 9 illustrates examples of photographed images in FIG. 8;

FIG. 15 illustrates a control flowchart by the running-environment recognition apparatus 2 in FIG. 14;

FIG. 16 illustrates processing contents at a step 104 in FIG. 15;

FIG. 17 illustrates processing contents at a step 106 in FIG. 15;

FIG. 18 illustrates a bird's eye view in the processing at a step 108a in FIG. 15;

FIG. 19 illustrates an example of the method for selecting a running assistance function based on a photographing environment of each in-vehicle camera;

FIG. 20 illustrates an example of the method for selecting the running assistance function in a case where the in-vehicle cameras are a front camera alone in FIG. 19;

FIG. 25 illustrates a functional block diagram of the running-environment recognition apparatus 2 in FIG. 23;

FIG. 26 illustrates a processing flowchart by the running-environment recognition apparatus 2 for implementing a function for assisting the vehicle so that the vehicle will not collide with an object in the surroundings;

FIG. 27 illustrates contents at a step 302a in FIG. 26;

FIG. 28 illustrates examples of the driving assistance functions to be selected at a step 305 in FIG. 26;

DESCRIPTION OF THE EMBODIMENTS

Figure 10:
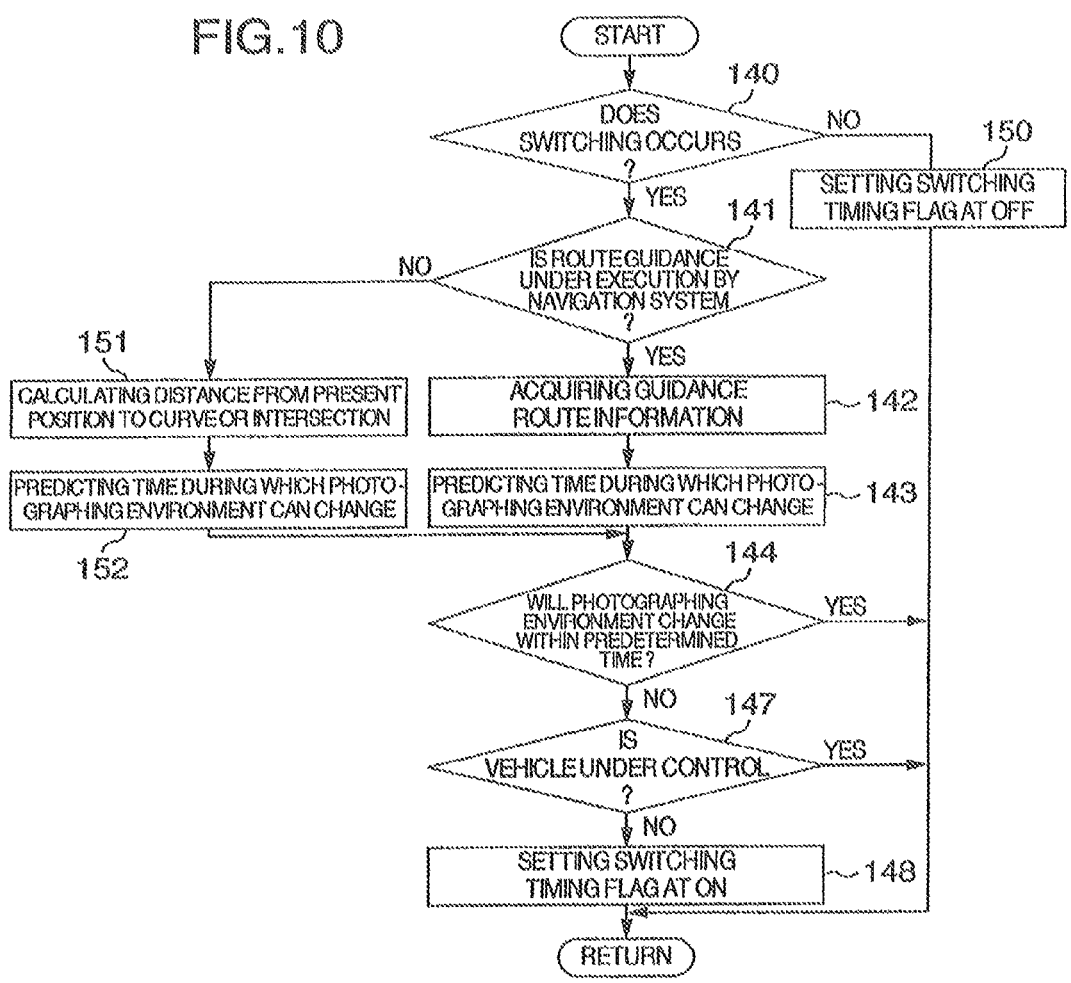
FIG. 10 illustrates a switching judgment processing at a step 106 in FIG. 3.

Hereinafter, the explanation will be given below concerning the embodiments. The present invention is applicable to, e.g., the following system: The system photographs the situation of a road in the vehicle's surroundings with a imaging device such as a camera. This operation allows the system to acquire information on the vehicle's peripheral environment needed for an in-vehicle system using an in-vehicle camera such as lane deviation warning system, and to perform the driving assistance and give a warning to the driver.

Embodiment 1

FIG. 1 illustrates a block configuration diagram of an in-vehicle system 1 which embodies a first embodiment.

The in-vehicle system 1 illustrated in FIG. 1 is the following system: The system, which is mounted on a vehicle, detects the position of the vehicle, guides its running route, and prevents the vehicle from deviating from the lane. The in-vehicle system 1 includes, as imaging devices, an in-vehicle camera 3a for photographing an image positioned forward of the vehicle, and another in-vehicle camera 3b for photographing an image positioned backward of the vehicle. The in-vehicle system 1 further includes a display 13 set up inside the vehicle compartment for displaying respective types of images and respective types of information, a speaker 14 for generating a warning voice when there is a danger of the vehicle's deviating from the running lane, an activation switch 15 for allowing the driver to operate the activation of a running assistance system, and a running-environment recognition apparatus 2 for controlling the operation of the entire in-vehicle system 1 starting with display control over the display 13.

Incidentally, here, in the embodiment two in-vehicle cameras, i.e., the in-vehicle camera 3a and the in-vehicle camera 3b, are provided. However, with respect to a to-be-processed image determination function which will be described later, the present invention is also applicable to a system equipped with one in-vehicle camera, or a system equipped with three or more in-vehicle cameras.

The in-vehicle camera 3a, which is fixed to, e.g., a rearview mirror unit inside the vehicle compartment, photographs the situation existing forward of the vehicle as an image looking down on the ground at a predetermined depression angle and a predetermined fixed position. Also, the in-vehicle camera 3b, which is fixed to, e.g., an upper portion of a rear bumper such that the rear bumper falls into the field-of-view, photographs the situation existing backward of the vehicle as an image looking down on the ground at a predetermined depression angle and a predetermined fixed position. The in-vehicle camera 3b can also be used for presenting the backward image to the driver when the vehicle retreats. The image (hereinafter, referred to as "frontward image"), which is positioned forward of the vehicle and is photographed by the in-vehicle camera 3a, and the image (hereinafter, referred to as "backward image"), which is positioned backward of the vehicle and is photographed by the in-vehicle camera 3b, are supplied to the running-environment recognition apparatus 2. The running-environment recognition apparatus 2 recognizes a lane mark forward of the vehicle and a lane mark backward of the vehicle. As a result of this, if the apparatus 2 judges that there is a danger of the vehicle's deviating from the running lane, the apparatus 2 notifies the driver of the danger via the display 13 and the speaker 14, or controls the vehicle so that the vehicle will not deviate from the running lane.

The display 13 is constituted with a display appliance such as, e.g., LCD (Liquid Crystal Display). Based on the display control by the running-environment recognition apparatus 2, the display 13 displays respective types of images such as, e.g., running-route guidance image by the navigation and rear-view monitor image. Also, if the running-environment recognition apparatus 2 recognizes a photographing environment such as water droplet adhering to lens of the in-vehicle camera 3a or in-vehicle camera 3b, based on the display control by the running-environment recognition apparatus 2, the display 13 displays a message notifying a report to the effect that the photographing environment is unsatisfactory. Also, if there occurs a necessity for halting the running assistance function, the display 13 displays a report to the effect as a message. Also, if the running-environment recognition apparatus 2 recognizes that the photographing environment is unsatisfactory, and if the running assistance function is halted, based on the control by the running-environment recognition apparatus 2, the speaker 14 is activated to make the report to the effect by the warning sound.

The running-environment recognition apparatus 2 is of a microprocessor configuration where the configuration components such as a CPU 6, a RAM 5, a data ROM 7, and a program ROM 4 are connected to each other via buses. The CPU 6 executes respective types of control programs stored in the program ROM 4, thereby controlling the operation of the entire in-vehicle system 1. In particular, in this running-environment recognition apparatus 2, the RAM 5 functions an image memory for memorizing the data on the frontward images and backward images. Here, the frontward images and backward images are photographed by the in-vehicle cameras 3a and 3b, i.e., an example of an input unit 3, and are subjected to the A/D conversion.

Moreover, in this running-environment recognition apparatus 2, the program ROM 4 respectively stores a running assistance program and a navigation program for exercising the control or issuing the warning so that the vehicle will not deviate from the running lane. The CPU 6 executes these programs, thereby implementing the navigation function and the running assistance function respectively.

Also, a vehicle-velocity sensor 9, a gyroscopic sensor 10, and a GPS (Global Positioning System) receiver 12 are connected to the running-environment recognition apparatus 2. The respective types of information read from a map database 11 stored in a data reproduction device such as DVD (Digital Versatile Disc) are supplied to the control unit. Moreover, at the time of normal operation of the in-vehicle system 1, the CPU 6 of the running-environment recognition apparatus 2 executes the navigation program. As a result of this execution, a running-route guidance map is displayed on the display 13. Here, on this guidance map, information such as the present position of the vehicle and a route searched for in accordance with an operation input by the driver are superposed on a map image supplied from the map database 11.

Furthermore, an ignition switch 8, which is turned ON at starting the engine of the vehicle, is connected to the running-environment recognition apparatus 2. When an ignition signal from this ignition switch 8 is supplied to the running-environment recognition apparatus 2, the CPU 6 of the running-environment recognition apparatus 2 executes the navigation program.

FIG. 2 illustrates a functional block diagram of the running-environment recognition apparatus 2 in FIG. 1.

When the switch for making the running assistance function effective is turned ON, the running assistance program is executed in addition to the navigation program. As a result of this execution, the running-environment recognition apparatus 2 is designed to function as the input unit 3, an image processing unit 16, a to-be-processed image determination unit 17, a switching judgment unit 19, an environment recognition unit 20, and an output unit 21.

The input unit 3 inputs the signals from the in-vehicle cameras 3a and 3b, the ignition switch 8, the vehicle-velocity sensor 9, the gyroscopic sensor 10, the map database 11, the GPS receiver 12, and the running-assistance-system activation switch 15.

The image processing unit 16 processes a function of possessing the images photographed by the in-vehicle camera 3a and the in-vehicle camera 3b respectively, thereby detecting halation caused by sunlight or headlight of a surrounding vehicle, and water droplet and dirt adhering to the lenses. The to-be-processed image determination unit 17 possesses a function of selecting or determining an image whose image recognition is executable and the corresponding image area from the photographing environment recognized by the image processing unit 16. The switching judgment unit 19 possesses a function of appropriately judging a timing with which the to-be-processed image is to be switched in correspondence with the running situation of the vehicle at a point-in-time when it is judged that the image, whose image recognition processing is to be performed by the to-be-processed image determination unit 17, needs to be switched. The environment recognition unit 20 possesses a function of detecting a lane mark from inside the image and the image area determined by the to-be-processed image determination unit 17. The output unit 21 possesses the following function: From the lane-mark detection result by the environment recognition unit 20, if there is a danger of the vehicle's deviating from the running lane, the unit 21 determines a control signal so that the vehicle will not deviate from the running lane, then controlling the vehicle by outputting the control signal to a brake control device 98 and a steering control device 99. Otherwise, the output unit 21 notifies the driver about the danger of the vehicle's deviating therefrom. Here, in the case of, e.g., a hydraulic-pressure brake, the brake control device 98 is a control device for the hydraulic-pressure channel. In the case of an electrically-operated brake, the device 98 is a control device for the electrically-operated actuator of the brake. The steering control device 99 is a control device associated with a motor for assisting or driving the steering or the hydraulic-pressure channel.

In the in-vehicle system 1 configured as described above, as explained earlier, at the time of the normal operation, the running-route guidance map is displayed on the display 13 by the navigation program executed by the CPU 6 of the running-environment recognition apparatus 2. Furthermore, if there occurs a necessity for halting the function of assisting the vehicle so that the vehicle will not deviate from the running lane by the running assistance program executed by the CPU 6 of the running-environment recognition apparatus 2, the message notifying the report to the effect is displayed on the display 13 in the superposed manner. Simultaneously, the warning sound is generated from the speaker 14, thereby notifying the driver of the vehicle about the report to the effect.

FIG. 3 illustrates a control flowchart by the running-environment recognition apparatus 2 in FIG. 1.

A series of processings illustrated in FIG. 3 are started when the ignition switch 8 is turned ON, and are repeated until the ignition switch 8 is turned OFF. It is preferable that the processings be carried out regardless of whether the vehicle is running or at a stop, or whether the image displayed on the display 13 is the running-route guidance map or some other image.

First, if the ignition switch 8 is turned ON, the running-environment recognition apparatus 2 executes the running assistance program and the navigation program, then judging whether or not the running-assistance-system activation switch 15 is ON (step 101). Moreover, when the activation switch 15 is turned ON, a frontward image and a backward image are photographed by the in-vehicle camera 3a and the in-vehicle camera 3b respectively, then the images are acquired and stored into the RAM 5 of the running-environment recognition apparatus 2. Then, the image processing unit 16 performs the processing of detecting halation, water droplet, and dirt with respect to each of the photographed images stored into the RAM 5 (step 102). Incidentally, here, the example of detecting the halation, water droplet, and dirt will be indicated. The present invention, however, is not limited thereto, but is applicable to whatever factors as long as they hinder the image processing.

FIG. 4 illustrates the halation detection processing at the step 102 in FIG. 3. FIG. 5 illustrates a halation detection area in the processing in FIG. 4.

First, an area in which halation is to be detected is set (step 113). Then, a binary image is created as follows: If luminance value of each pixel within the set detection area is larger than a threshold value, the pixel value is set at 1. Meanwhile, if the luminance value is smaller than the threshold value, the pixel value is set at 0 (step 114). Next, one and the same label is allocated (hereinafter, this allocation will be referred to as "labeling") to pixels whose pixel values are equal to 1 and which are adjacent to each other within this binary image (step 115). Moreover, with respect to the data after the labeling is over, the number of the pixels on each label basis is counted, then being stored into an arrangement (Ch) (step 116). Then, the maximum value (CHm) is calculated from the value of Ch, and simultaneously the label (Ln) at that time is determined (step 117). At a step 118, it is judged whether or not the value of CHm is larger than a threshold value. If the value of CHm is larger than the threshold value, the halation is judged to have occurred, then turning a halation detection flag ON (step 119). Simultaneously, as illustrated in FIG. 5, start point (RHsx, RHsy) and termination point (RHex, RHey) of a circumscribed rectangle of the halation area are calculated, then defining this rectangular area as the area in which the halation occurs (step 120). Also, if the value of CHm is smaller than the threshold value, the halation is judged not to have occurred.

FIG. 6 illustrates the detection processing of the water droplet and dirt at the step 102 in FIG. 3. FIG. 7 illustrates a detection area for the water droplet and dirt in the processing in FIG. 6.

First, an area in which the water droplet and dirt are to be detected is set (step 121). Then, within the set detection area, a change amount in luminance between adjacent pixels (hereinafter, this amount will be referred to as "edge intensity") is calculated (hereinafter, referred to as "edge detection"), using, e.g., Sobel operator (step 122). Next, if, at a step 123, velocity of the vehicle is higher than a threshold value, an edge detection result in the past and the edge detection result calculated this time are averaged, then storing the averaged value into an arrangement Ed as an accumulation value of the edge detections (step 124). Also, if, at the step 123, the velocity of the vehicle is lower than the threshold value, the arrangement Ed is set at an initial value (step 129). Moreover, the number Ce of the pixels is counted in which the edge intensity of the edge-detection accumulation result Ed becomes larger than a threshold value (step 125). Then, it is judged whether or not the value of Ce determined at the step 125 is larger than a threshold value (step 126). If the value of Ce is larger than the threshold value, the water droplet or dirt is judged to exist, then turning a water-droplet/dirt detection flag ON (step 127). Simultaneously, as illustrated in FIG. 7, start point (RWsx, RWsy) and termination point (RWex, RWey) of a circumscribed rectangle of the water-droplet/dirt area are calculated, then defining this rectangular area as the area in which the water droplet and dirt exist (step 128). Also, if, at the step 126, the value of Ce is judged to be lower than the threshold value, the water droplet and dirt are judged not to exist.

Getting back to FIG. 3, it is judged from the above-described recognition result of the photographing environment whether or not continuing the image recognition processing is possible (step 103). It is judged that continuing the image recognition processing is impossible in the following case: Namely, the image processing unit 16 detects the water droplet and dirt from the set-up positions of the in-vehicle cameras and the corresponding images based thereon, e.g., the image forward of the vehicle photographed by the camera set up forward of the vehicle, and the image backward of the vehicle photographed by the camera set up backward of the vehicle, and simultaneously, size (i.e., planar dimension or the like) of the water-droplet/dirt area is larger than a threshold value.

If continuing the image recognition processing is possible, the to-be-processed image determination unit 17 determines an image and an image area which are to be used for the running assistance (step 104). This determination is performed based on the photographing environment recognized at the step 102, and the size and position of the area in which the halation occurs and the size and position of the area to which the water-droplet/dirt adheres. In this case, it is preferable to mask the halation area and the water-droplet/dirt area, and to use the other areas for the running assistance. The halation area and the water-droplet/dirt area, however, may be used as long as a target detection to be used for the running assistance is made executable by a further image processing in these areas.

Meanwhile, if continuing the image recognition processing is impossible, it is judged whether or not the present point-in-time is a termination timing for the running assistance system, or it is judged whether or not the forced termination is necessary (step 110). Then, if the running assistance system is to be halted or terminated by outputting the control signal to the steering control device 99 and the brake control device 98, the driver is notified of a report to the effect and a cause for the termination (step 111). Simultaneously, the termination processing is performed (step 112). This report allows the driver of the vehicle to recognize that the running assistance system does not operate normally. Accordingly, the driver finds it possible to properly deal with this situation, e.g., eliminating the water-droplet/dirt adhering to the lens.

In the in-vehicle system 1, the recognition processing of the photographing environment is continued after the halt of the running assistance system as well. Furthermore, it is periodically judged whether or not recovery of the running assistance system is made possible by the running-environment recognition apparatus 2 until the ignition switch 8 is turned OFF. If the recovery is judged to be made possible, the driver is notified of a report to the effect. The judgment as to whether or not the recovery is made possible is performed based on the recognition result given by the image processing unit 16. If the recovery is possible, e.g., if both the halation detection flag and the water-droplet/dirt detection flag are turned ON, a report to the effect is displayed on the display 13 in a superposed manner. Simultaneously, a sound is generated from the speaker 14, thereby notifying the driver of the report. Also, if it is judged that the present point-in-time is not the termination timing, and that the forced termination is unnecessary, the image and the image area in which the image recognition processing is to be performed are determined (step 104).

FIG. 8 illustrates the processing contents at the step 104 in FIG. 3. FIG. 9 illustrates examples of photographed images in FIG. 8.

First, as an initial state, the rear-camera operation mode is set at a halt mode (step 130). Next, at a step 131, it is judged whether or not at least either of the halation detection flag and the water-droplet/dirt detection flag of the front camera is ON. If both of the halation detection flag and the water-droplet/dirt detection flag are OFF, the front-camera operation mode is set at a two-lane detection mode (step 137). If either of the halation detection flag and the water-droplet/dirt detection flag is ON, it is judged whether or not a lane mark is detectable in only one lane in the frontward image (step 133). For example, when the halation area (RHsx, RHsy, RHex, RHey) and the water-droplet/dirt area (RWsx, RWsy, RWex, RWey) exist in only the left-half or right-half of the frontward image, it is judged that only one lane is detectable. If even one lane is not detectable, the front-camera operation mode is set at a halt mode (step 138). Moreover, the situation associated with the rear camera is processed in a manner similar to the case of the front camera. First, at a step 134, it is judged whether or not at least either of the halation detection flag and the water-droplet/dirt detection flag of the rear camera is ON. If both of the halation detection flag and the water-droplet/dirt detection flag are OFF, the rear-camera operation mode is set at a two-lane detection mode (step 139). If either of the halation detection flag and the water-droplet/dirt detection flag is ON, it is judged whether or not a lane is detectable in only one lane in the frontward image (step 135). Furthermore, if one lane is detectable, the rear-camera operation mode is set at a one-lane detection mode (step 136). In this processing of determining the to-be-processed image, the frontward image and backward image may be always processed as illustrated in FIG. 9. Also, if the halation area and the water-droplet/dirt area are detected even in the slightest amount by the image processing unit 16, the following processing is allowable: The lane detection processing based on the backward image is started. Then, when the planar dimension of the halation area or the water-droplet/dirt area becomes larger than a specified value, the lane detection processing based on the frontward image is halted, thereby detecting the lane from the backward image alone. Switching these halt mode, two-lane detection mode, and one-lane detection mode is essentially equivalent to switching the environment recognition method and environment recognition program executed by the running-environment recognition apparatus 2.

In this way, the photographed images and recognition results obtained by the plurality of in-vehicle cameras are compared with each other. This processing allows implementation of an enhancement in the recognition accuracy, thereby making it possible to operate the system even under a photographing environment in which the system cannot be operated by the conventional technologies. Accordingly, it also becomes possible to reduce a possibility of making false recognition even in such a situation as rain weather, where the photographing environments become simultaneously worse between the plurality of cameras.

Getting back to FIG. 3, at the next step 106, it is judged whether or not the to-be-processed image should be switched, if the determination result of the to-be-processed image differs from the image area on the previous frame determined the last time, or if the determination result of the operation mode differs from its determination result the last time.

FIG. 10 illustrates a to-be-processed image switching judgment processing at the step 106 in FIG. 3.

First, it is judged whether or not the to-be-processed image determined by the to-be-processed image determination unit 17 differs from the to-be-processed image on the previous frame (step 140). If no switching occurs, a switching timing flag is set at OFF (step 150). Meanwhile, if the switching occurs, at a step 141, it is judged whether or not the route guidance is under execution by the navigation system. If the route guidance is under execution, a guidance route is acquired that is the route along which the vehicle is going to travel in the future (step 142). Also, a time during which the photographing environment can change is predicted from the guidance route and the map database (step 143). Meanwhile, if, at the step 141, the route guidance by the navigation system is not under execution, a distance from the present position to the nearest curve or intersection is calculated from the present position and the map data (step 151). Also, the time during which the photographing environment will change is calculated from the calculated distance and the vehicle's velocity (step 152). Moreover, a comparison is made between the time calculated at the step 152 or the step 143 and a predetermined value (step 144). In addition, if the calculated time is smaller than the predetermined value, the photographing environment will change soon. Accordingly, the to-be-processed image area or to-be-processed image itself the last time is maintained, and no switching for them is performed. Furthermore, it is judged whether or not the control over the steering or brake is performed at present by the driver or the controller mounted on the vehicle (step 147). This judgment may be made based on the value of the output unit of the running-environment recognition apparatus 2, may be made by inputting a signal inputted from the input unit 3 and transmitted from another in-vehicle controller, or may be made by inputting the signal from the brake control device 98 or steering control device 99. If the control is not executed, the switching timing flag is set at ON (step 148). Disturbances in the behavior of the vehicle can be eliminated by not switching the running assistance function during the control over the vehicle.

The judgment processing for judging the switching of a to-be-processed image like this makes it possible to avoid the following problem described earlier: The switching of the to-be-processed image occur so frequently when, in the evening, the vehicle is running between buildings, or when the headlight is directed at the vehicle by a vehicle coming from the opposite direction in such a place as an expressway having a central divider of hedge, and thus the state where the vehicle is illuminated with the sunlight or headlight and the state where the vehicle is intercepted from the sunlight or headlight are repeated alternately in a short while.

Getting back to FIG. 3, if, at the step 106, it is judged that the to-be-processed image should be switched, a processing for switching the to-be-processed image and operation mode is performed (step 107), then performing a lane-mark detection processing (step 108). Meanwhile, if it is judged that the to-be-processed image should not be switched, the lane-mark detection processing is performed without performing the switching processing.

Figure 11:
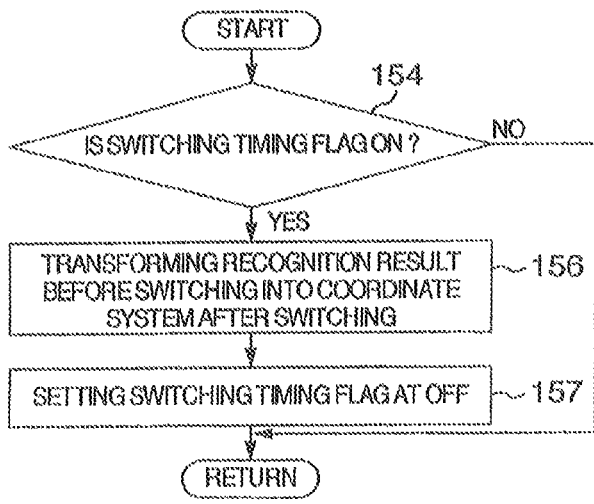
FIG. 11 illustrates a to-be-processed image switching processing at a step 107 in FIG. 3.

FIG. 11 illustrates the to-be-processed image switching processing at the step 107 in FIG. 3.

First, if, at a step 154, it is judged that the switching timing flag is ON, the recognition result before the switching is transformed into a coordinate system after the switching (step 156). Then, the switching timing flag is set at OFF (step 157).

Getting back to FIG. 3, in the lane-mark detection processing at the step 108, if the front-camera operation mode is set at the two-lane detection mode, two lane marks are detected. If the operation mode is set at the one-lane detection mode, one lane mark is detected. Also, if the operation mode is set at the halt mode, the detection processing for detecting the lane mark in the frontward image is not performed. Using the rear camera, similarly, the detection processing for detecting the lane mark is performed based on the rear-camera operation mode. At this time, the position of the lane mark on the present frame is predicted using the detection results obtained up to the previous frame. When the to-be-processed image is switched by performing the coordinate transformation of the each photographed image in the above-described to-be-processed image switching processing (step 107), similarly, the position of the lane mark on the present frame becomes predictable from the previous frame.

From the lane position on the image determined by the above-described processing, for example, the output unit 21 outputs the control signal to the steering control device 99 so that the vehicle will not deviate from the lane. Also, the output unit 21 outputs the control signal to the brake control device 98 so that the vehicle will stop in front of an obstructing object recognized by the image processing. Also, if there is a danger of the vehicle's deviating from the lane, the output unit 21 notifies the driver of the report to the effect (step 109). In the control/warning processing at the step 109, the lane deviation warning processing is executed using the detection result of the lane mark.

Figure 12:
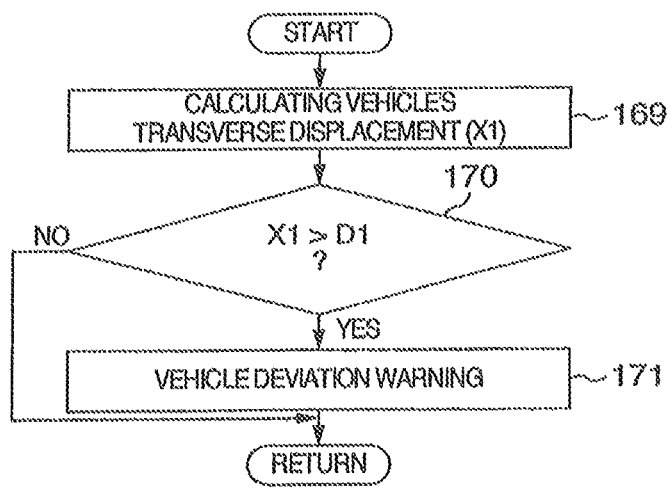
FIG. 12 illustrates a control/warning processing at a step 109 in FIG. 3.
Figure 13:
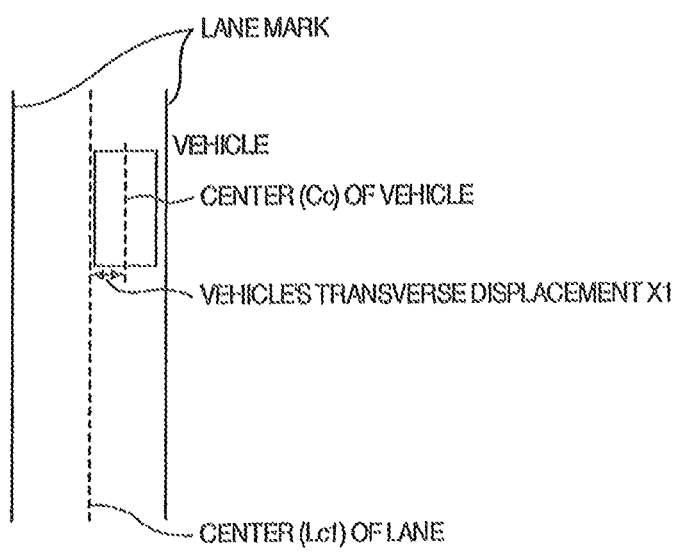
FIG. 13 illustrates an explanatory diagram for explaining each parameter in the processing in FIG. 12.

FIG. 12 illustrates the control/warning processing at the step 109 in FIG. 3. FIG. 13 illustrates an explanatory diagram for explaining each parameter in the processing in FIG. 12.

First, a vehicle's transverse displacement (X1) is calculated which is a difference between the central line of lane marks at the right and left of the vehicle and the center of the vehicle illustrated in FIG. 13 (step 169). Then, it is judged whether or not X1 is larger than a predetermined value D1 (step 170). Next, if X1 is smaller than D1, it is judged that there is the danger of the vehicle's deviating from the lane, then notifying the driver of the danger (step 171).

Incidentally, in the steering control at the step 109, a steering operation for preventing the vehicle's deviating from the lane may be performed full-automatically. Otherwise, with respect to a steering operation in a direction for permitting the vehicle's deviating from the lane, a steering rotation torque maybe applied to a rotation direction in which this steering operation is hindered.

As having been explained so far, in the in-vehicle system 1 in the present embodiment, a photographing environment of the in-vehicle camera 3a and the in-vehicle camera 3b is recognized. Then, a to-be-processed image to be used for the image recognition processing is determined in correspondence with the photographing environment. Moreover, when the running assistance function halts, the driver is notified of a report to the effect and a cause for the halt. This report allows the driver to eliminate the water droplet and dirt adhering to lenses of the in-vehicle cameras, and to improve the photographing environment, thereby making it possible to operate the system properly.

Also, when the system using the in-vehicle cameras judges that it is difficult to continue the operation of the system, instead of the running-environment recognition apparatus 2's halting the system, the driver of the vehicle may halt the system on the basis of the information of which the running-environment recognition apparatus 2 notifies the driver, thereby preventing a false operation of the driving assistance system.

Furthermore, in the in-vehicle system 1, it can be confirmed whether or not the system is operating normally by intentionally causing the halation to occur in the front camera or rear camera, or by intentionally attaching water droplet thereon.

Also, in the in-vehicle system 1, shutter speeds and gains of the in-vehicle camera 3a and the in-vehicle camera 3b are set at mutually different values in advance. For example, the rear camera is set at a higher shutter speed and a lower gain as compared with the ones of the front camera. This setting allows a lane mark to be stably detected even in a case where intensity of the incident light changes steeply such as, e.g., entrance or exit of a tunnel.

Embodiment 2

Referring to the drawings, the explanation will be given below concerning a second embodiment.

Figure 14:
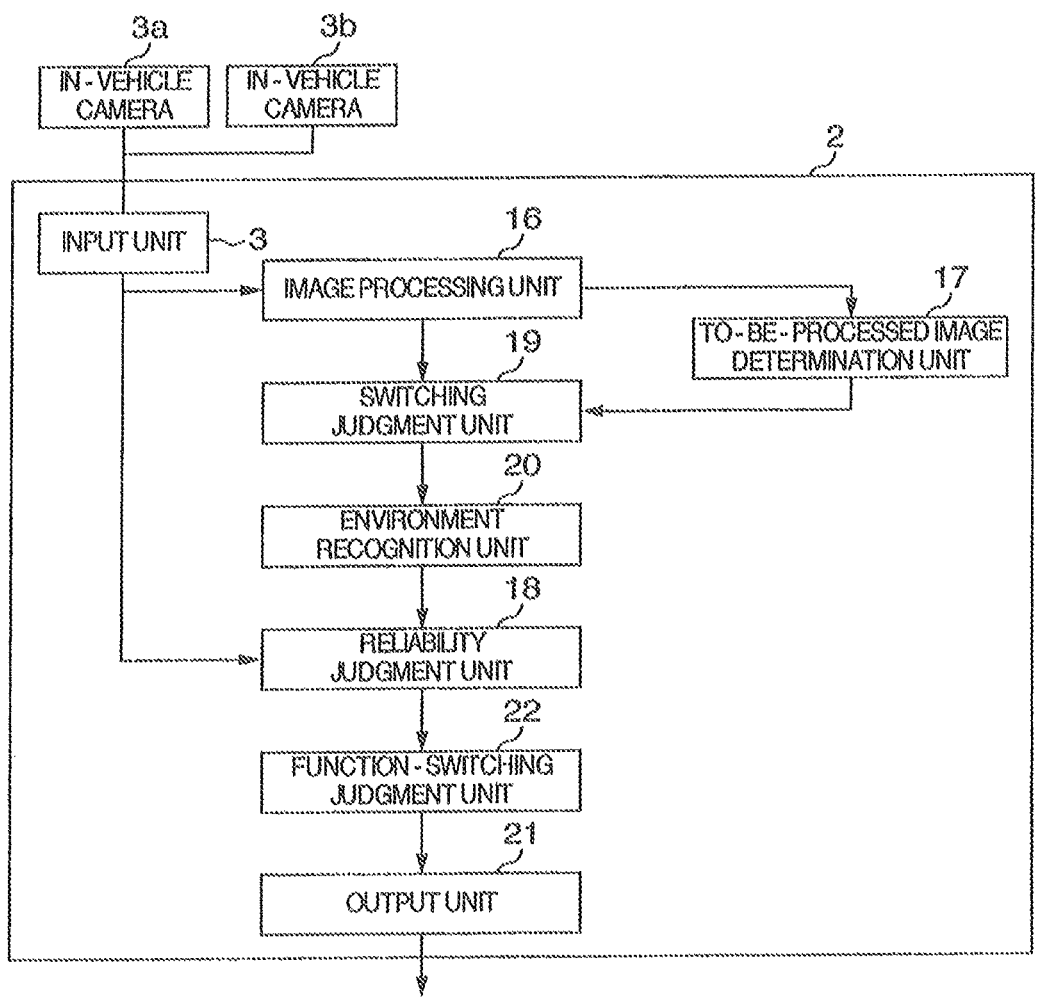
FIG. 14 illustrates a functional block diagram of the running-environment recognition apparatus 2 which embodies a second embodiment.

FIG. 14 illustrates a functional block diagram of the running-environment recognition apparatus 2 as the second embodiment. Incidentally, with respect to the configuration of the in-vehicle system 1 of the present embodiment, the same reference numerals will be affixed to basically the same configuration components in the drawings, and the overlapped explanation thereof will be omitted.

The present embodiment is applied to the in-vehicle system 1 as illustrated in FIG. 1. As illustrated in FIG. 14, the running-environment recognition apparatus 2 includes the image processing unit 16, the to-be-processed image determination unit 17, the switching judgment unit 19, the environment recognition unit 20, a reliability judgment unit 18, a function-switching judgment unit 22, and the output unit 21.

The reliability judgment unit 18 possesses a function of contrasting and comparing recognition results of the respective photographed images by the environment recognition unit, and amending the recognition results, and a function of properly selecting an executable running assistance function from the photographing environments of the respective photographed images.

The function-switching judgment unit 22 possesses a function of properly judging a timing with which the running assistance function is to be switched when the switching of the running assistance function occurs in the reliability judgment unit 18.

The output unit 21 possesses the following function: From the lane-mark detection result by the environment recognition unit 20, if there is a danger of the vehicle's deviating from the running lane, the unit 21 controls the vehicle so that the vehicle will not deviate from the running lane, or notifies the driver about the danger of the vehicle's deviating therefrom.

In the in-vehicle system 1 configured as described above, as explained earlier, at the time of the normal operation, the running-route guidance map is displayed on the display 13 by the navigation program executed by the CPU 6 of the running-environment recognition apparatus 2. Furthermore, if there occurs a necessity for switching the function of assisting the vehicle so that the vehicle will not deviate from the running lane by the running assistance program executed by the CPU 6 of the running-environment recognition apparatus 2, a message notifying the report to the effect is displayed on the display 13 in a superposed manner. Simultaneously, a warning sound is generated from the speaker 14, thereby notifying the driver of the vehicle about the report to the effect.

Here, referring to a flowchart, the explanation will be given below concerning a processing flow of the function of assisting the vehicle so that the vehicle will not deviate from the running lane by the running-environment recognition apparatus 2 in the in-vehicle system 1 as described above.

FIG. 15 illustrates the control flowchart executed by the running-environment recognition apparatus 2 in FIG. 14.

First, if the ignition switch 8 is turned ON, the running-environment recognition apparatus 2 executes the running assistance program and the navigation program, then judging whether or not the running-assistance-system activation switch 15 is ON (step 101). Moreover, when the activation switch 15 is turned ON, a frontward image and a backward image are photographed by the in-vehicle camera 3a and the in-vehicle camera 3b respectively, then being grabbed and stored into the RAM 5 of the running-environment recognition apparatus 2. Then, the image processing unit 16 performs the processing of detecting halation, water droplet, and dirt with respect to each of the photographed images grabbed into the RAM 5 (step 102).

Next, it is judged from the recognition result of the photographing environment whether or not continuing the image recognition processing is possible (step 103). It is judged that continuing the image recognition processing is impossible in the following case: Namely, the image processing unit 16 detects the water droplet and dirt from the set-up positions of the in-vehicle cameras and the corresponding images based thereon, e.g., the image forward of the vehicle photographed by the camera set up forward of the vehicle, and the image backward of the vehicle photographed by the camera set up backward of the vehicle, and simultaneously, planar dimension of the water-droplet/dirt area is larger than a threshold value. If continuing the image recognition processing is possible, the to-be-processed image determination unit 17 determines an image and an image area which are to be used for the running assistance (step 104). This determination is performed based on the photographing environment recognized at the step 102, and the size and position of the area in which the halation occurs and the size and position of the area to which the water-droplet/dirt adheres.

Meanwhile, if continuing the image recognition processing is impossible, it is judged whether or not the present point-in-time is a termination timing for the running assistance system, or it is judged whether or not the forced termination is necessary (step 110). Then, if the running assistance system is to be terminated, the driver is notified of a report to the effect and a cause for the termination (step 111). Simultaneously, the termination processing is performed (step 112). Also, if it is judged that the present point-in-time is not the termination timing, and that the forced termination is unnecessary, the processing proceeds to the processing at the step 104.

Moreover, if the determination result of the to-be-processed image differs from the previous frame, it is judged whether or not the present point-in-time is a to-be-processed image switching timing (step 106). If it is judged that the present point-in-time is not the to-be-processed image switching timing, a lane-mark detection processing is performed without performing the switching processing (step 108).

Meanwhile, if it is judged that the present point-in-time is the to-be-processed image switching timing, a processing for switching the to-be-processed image is performed (step 107), then performing the lane-mark detection processing (step 108). Moreover, at a step 108a, a comparison and investigation is made between the forward lane-mark detection result and the backward lane-mark detection result, then amending the recognition result. Simultaneously, as illustrated in FIG. 19 a running assistance function is selected or determined from the photographing environments of the respective in-vehicle cameras. Furthermore, at a step 108b, as is the case with the step 106, it is judged whether or not the present point-in-time is a function switching timing. If it is judged that the present point-in-time is the function switching timing, a processing for switching the function is performed (step 108c).

From the lane position on the image determined by the above-described processing, a control/warning unit performs the steering control so that the vehicle will not deviate from the lane. Otherwise, if there is a danger of the vehicle's deviating from the lane, the control/warning unit notifies the driver of a report to the effect (step 109).

Hereinafter, in accordance with flowcharts, the explanation will be given below concerning the processings ranging from the step 104 to the step 109.

FIG. 16 illustrates the processing contents at the step 104 in FIG. 15.

First, it is judged whether or not at least either of the halation detection flag and the water-droplet/dirt detection flag of the front camera is ON (step 201). If both of the flags are OFF, the front-camera operation mode is set at a two-lane detection mode (step 207). If either of the flags is OFF, it is judged from the sizes and positions of the halation detection area and the water-droplet/dirt detection area whether or not a lane mark is detectable in only one lane (step 202). If the lane mark is detectable, the front-camera operation mode is set at a one-lane detection mode (step 203). Meanwhile, if the lane mark is undetectable, the front-camera operation mode is set at a halt mode (step 208). With respect to the rear camera as well, its operation mode is set from the step 204 to the step 206 and the step 209 and the step 210. In this to-be-processed image determination, both the frontward image and backward image are always subjected to the image recognition processing when the photographing environment is satisfactory enough.

FIG. 17 illustrates the processing contents at the step 106 in FIG. 15.

First, it is judged whether or not the running assistance function on the previous frame and the running assistance function selected by a function selection unit differ from each other (step 140). If no switching occurs, a switching timing flag is set at OFF (step 150). Meanwhile, if the switching occurs, at a step 141, it is judged whether or not the route guidance is under execution by the navigation system. If the route guidance is under execution, a guidance route is acquired (step 142). Also, a time during which the photographing environment can change is predicted from the guidance route and the map database (step 143). Meanwhile, if, at the step 141, the route guidance by the navigation system is not under execution, a distance from the present position to the nearest curve or intersection is calculated from the present position and the map data (step 151). Also, the time during which the photographing environment can change is calculated from the calculated distance and the vehicle's velocity (step 152). Moreover, it is judged whether or not the time calculated at the step 152 or the step 143 falls within a predetermined time (step 144). In addition, if the calculated time is shorter than the predetermined time, the photographing environment will change soon, and thus the switching of the running assistance function is not performed. Meanwhile, if the calculated time is longer than the predetermined time, at a step 145, it is judged whether or not the driver has been already notified of the switching of the function. This processing prevents existence of the halation, which is caused by sunlight, from causing the running assistance function to be switched every time the traveling direction of the vehicle changes while the vehicle is running along a road with a lot of curves and intersections. Furthermore, if, at the step 145, the driver has been not already notified, using the display and speaker, the driver is notified of a report to the effect that the running assistance function will be switched (step 153). Meanwhile, if the driver has been already notified, it is judged whether or not a certain constant time has elapsed after the report (step 146). If the constant time has elapsed, it is judged whether or not the control over the steering or brake is executed at present (step 147). If the control is not executed, the switching timing flag is set at ON (step 148). Then, the driver is notified of a report to the effect that the switching has been terminated (step 149). Disturbances in the behavior of the vehicle can be eliminated by not switching the running assistance function during the control over the vehicle.

The switching processing for switching the to-be-processed image/running assistance function at the step 107 is basically the same as the one in the first embodiment.

The lane-mark detection processing at the step 108 is also basically the same as one in the first embodiment. FIG. 18 illustrates a bird's eye view in the processing at the step 108a in FIG. 15. At the step 108a, a lane-mark detection result in the frontward image is transformed into a coordinate system (hereinafter, referred to as "bird's eye view") which is seen from directly above the road. Similarly, a lane-mark detection result in the backward image is transformed into the bird's eye view. If a detection error d in the lane-mark detection results, i.e., a position error quantity, is larger than a predetermined value in this transformed coordinate system, the detection of the corresponding lane mark is assumed to be invalid. In this way, the image recognition processing is not only applied to the respective photographed images on each photographed-image basis, but also the respective recognition results are compared and investigated with each other. This processing makes it possible to obtain a high recognition accuracy. In the case of a detection target where the surrounding vehicles are not simultaneously photographed by the plurality of cameras, it is assumed that the recognition can be implemented when the target is recognized by the rear camera after the target is recognized by the front camera. Namely, a pursue/prediction processing like this is performed, and then the recognition results in the respective photographed images may be compared and investigated with each other.

FIG. 19 illustrates an example of the method for selecting or switching a running assistance function based on the photographing environment of each in-vehicle camera. In this embodiment, an example is indicated where the selection or switching of the running assistance function is performed by the output unit 21. The output unit 21 outputs a control signal corresponding to the selected or switched running assistance function. Here, the running assistance function is selected by the front-camera operation mode and the rear-camera operation mode. For example, if two lanes are detectable with the front camera, a lane keep or lane deviation warning is executed regardless of the photographing environment of the rear camera. If one lane is detectable with the front camera, and if only one lane is detectable with the rear camera as well, a low-level lane deviation warning is executed. This low-level lane deviation warning is as follows: If, e.g., the distance between the center of the running lanes predicted from a one-side lane and the center of the vehicle becomes longer than a predetermined value, it is assumed that there is a danger of the vehicle's deviating from the lane. As a result, a warning sound is generated from the speaker and, if the vehicle steps on and deviates from the lane, the warning sound is generated from the speaker intermittently.

FIG. 20 illustrates an example of the method for selecting the running assistance function in a case where the in-vehicle cameras are the front camera alone in FIG. 19.

Getting back to FIG. 15, at the step 108b, the processing similar to the to-be-processed image switching processing is performed. At the step 108c, the function switching timing flag is set at ON.

Moreover, in the control/warning processing at the step 109, if the running assistance mode selected by the reliability judgment unit is the lane deviation warning, the lane deviation warning is executed. Also, if the running assistance mode selected is the low-level lane deviation warning, the low-level lane deviation warning is executed.

Figure 21:
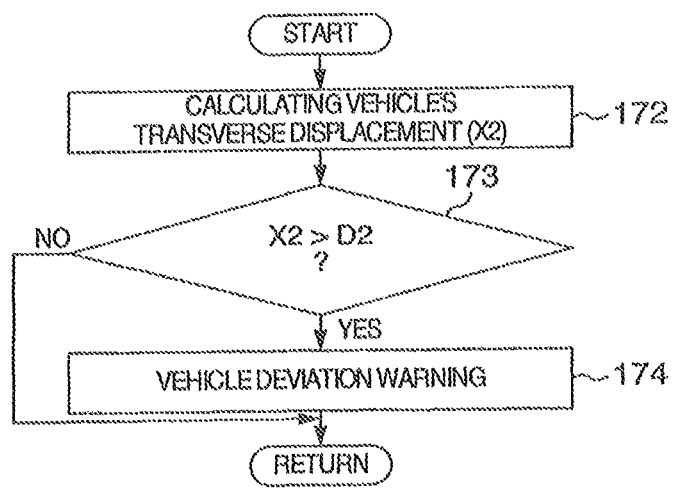
FIG. 21 illustrates a processing in a case where the running assistance mode is a low-level lane deviation warning at a step 109.
Figure 22:
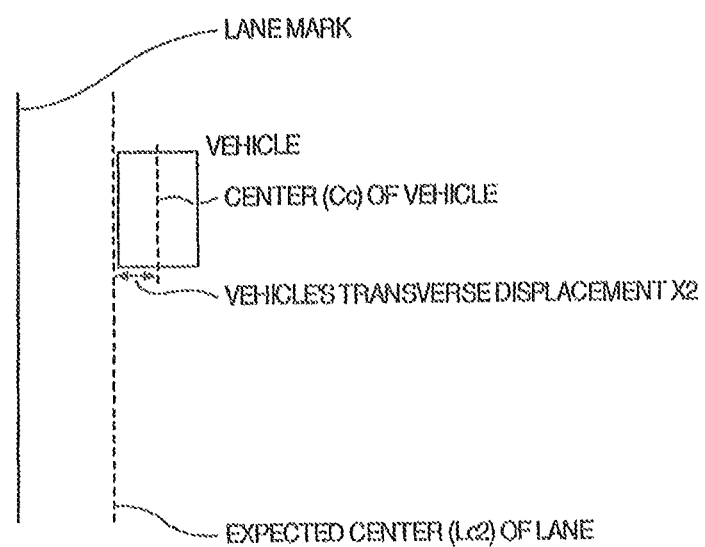
FIG. 22 illustrates an explanatory diagram for explaining FIG. 21.

FIG. 21 illustrates a processing in the case where the running assistance mode is the low-level lane deviation warning at the step 109. FIG. 22 illustrates an explanatory diagram for explaining FIG. 21.

First, as illustrated in FIG. 22, the central line of right and left lane marks is estimated from the lane mark on the one side (i.e., left side in the drawing) of the vehicle and the standard of lane width, thereby calculating the vehicle's transverse displacement (X2), i.e., the difference between the central line and the center of the vehicle (step 172). Then, it is judged whether or not X2 is larger than a predetermined value D2 (step 173). Next, if X2 is smaller than D2, it is judged that there is a danger of the vehicle's deviating from the lane, then notifying the driver of the danger (step 174).

As having been explained so far, in the in-vehicle system 1, a photographing environment of the in-vehicle camera 3a and the in-vehicle camera 3b is recognized. Then, a driving assistance function in correspondence with the photographing environment is executed. Moreover, the driver of the vehicle is notified of the driving assistance function under execution, and a report to the effect that the driving assistance function is switched when switched and a cause for the switching. This report allows the driver to eliminate the water droplet and dirt adhering to lenses of the in-vehicle cameras, and to improve the photographing environment, thereby making it possible to operate the system properly. Also, when the system using the in-vehicle cameras judges that it is difficult to continue the operation of the system, the control unit halts the system. Otherwise, the driver of the vehicle halts the system on the basis of the information of which the running-environment recognition apparatus 2 notifies the driver, thereby making it possible to prevent a false operation of the driving assistance system.

Embodiment 3

Referring to the drawings, the explanation will be given below concerning a third embodiment.

Figure 23:
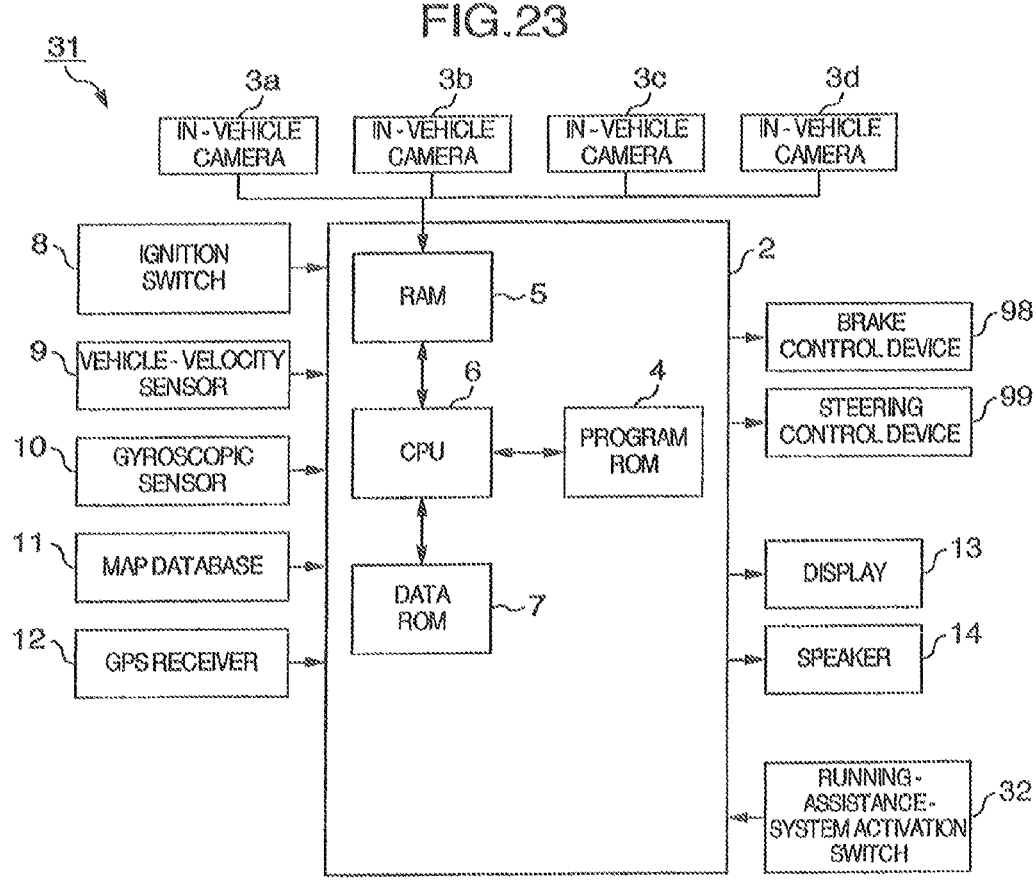
FIG. 23 illustrates a block configuration diagram of an in-vehicle system 31 which embodies a third embodiment.

FIG. 23 illustrates a functional block diagram of a running-environment recognition apparatus 31 which embodies the third embodiment. Incidentally, with respect to the configuration of the in-vehicle system 31 of the present embodiment, the same reference numerals will be affixed to basically the same configuration components in the drawings, and the overlapped explanation thereof will be omitted.

Figure 24:
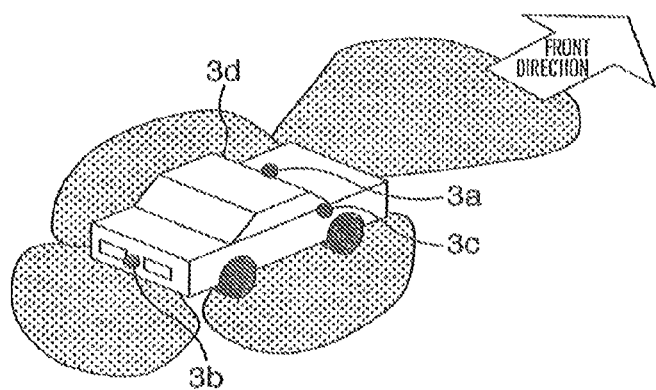
FIG. 24 illustrates a set-up example of in-vehicle cameras 3a to 3d in FIG. 23.

The present embodiment is applied to the in-vehicle system 31 as illustrated in FIG. 23. The in-vehicle system 31 implements the following function: Namely, the in-vehicle camera 3a, the in-vehicle camera 3b, an in-vehicle camera 3c, and an in-vehicle camera 3d included in this in-vehicle system 31 recognize an environment in the surroundings of the vehicle. Then, if there is a danger of the vehicle's colliding with a vehicle or an obstructing object on the periphery of the vehicle, the in-vehicle system 31 performs the steering control by outputting a control signal to the steering control device 99, performs the brake assistance control by outputting a control signal to the brake control device 98, or issues a warning to the driver with the display 13 and the speaker 14, FIG. 24 illustrates a set-up example of the in-vehicle cameras 3a to 3d in FIG. 23.

In addition to the in-vehicle camera 3a set up forward of the vehicle and the in-vehicle camera 3b fixed above an upper portion of the rear bumper backward of the vehicle, this vehicle further includes the in-vehicle camera 3c and the in-vehicle camera 3d on the sides of the vehicle, e.g., at side mirror portions of the vehicle. Moreover, these in-vehicle camera 3c and in-vehicle camera 3d photograph the situation existing on both sides and backward side of the vehicle as images looking down on the ground at predetermined depressions angle and predetermined fixed positions, and including an approaching vehicle from behind and an adjacent vehicle running along beside.

Both the frontward image and the backward image and the mages (hereinafter, referred to as "side images") which are obtained by photographing the sides of the vehicle are supplied to the running-environment recognition apparatus 2. The running-environment recognition apparatus 2 recognizes a vehicle or an obstructing object existing forward, backward, and sides of the vehicle. Then, if there is a danger of the vehicle's colliding with these objects, the running-environment recognition apparatus 2 notifies the driver of the danger via the display 13 and the speaker 14, or carries out the steering control or the brake assistance depending on the requirements.

Based on the display control by the running-environment recognition apparatus 2, the display 13 displays respective types of images such as, e.g., running-route guidance image by the navigation and rear-view monitor image. Also, based on the display control by the apparatus 2, this display 13 displays a detection processing state of the obstructing objects such as a surrounding vehicle. Moreover, if it is impossible to execute the object recognition processing with an image photographed by any one of the in-vehicle cameras 3a to 3d, the display 13 displays a message notifying a report to the effect that the photographing environment is unsatisfactory under the control by the running-environment recognition apparatus 2 and the unsatisfactory in-vehicle camera. Also, if, in the in-vehicle cameras, it is judged by the running-environment recognition apparatus 2 that it is impossible to continue the driving assistance function, the speaker 14 is activated under the control by the running-environment recognition apparatus 2, thereby making a report to the effect by a warning sound.

In this running-environment recognition apparatus 2, the program ROM 4 respectively stores a running assistance program for assisting the vehicle so that the vehicle will not collide with an adjacent vehicle or an obstructing object on the periphery of the vehicle, and a navigation program. The CPU 6 executes these programs, thereby implementing the navigation function and the driving assistance function respectively.

Also, the ignition switch 8, which is turned ON at starting the engine of the vehicle, is connected to the running-environment recognition apparatus 2. When an ignition signal from this ignition switch 8 is supplied to the running-environment recognition apparatus 2, the CPU 6 of the running-environment recognition apparatus 2 executes the running assistance program.

FIG. 25 illustrates a functional block diagram of the running-environment recognition apparatus 2 in FIG. 23.

The running-environment recognition apparatus 2 includes the image processing unit 16, the to-be-processed image determination unit 17, the switching judgment unit 19, the environment recognition unit 20, the reliability judgment unit 18, the function-switching judgment unit 22, and the output unit 21. The image processing unit 16 processes a function of possessing the images photographed by the in-vehicle camera 3a, the in-vehicle camera 3b, the in-vehicle camera 3c, and the in-vehicle camera 3d respectively, and thereby detecting halation caused by sunlight or headlight of a surrounding vehicle, water droplet and dirt adhering to the lenses, and rainfall and mist. The environment recognition unit 20 possesses a function of detecting an object from an image whose image recognition processing is judged to be executable by the image processing unit 16 from among the images photographed by the in-vehicle camera 3a, the in-vehicle camera 3b, the in-vehicle camera 3c, and the in-vehicle camera 3d. The output unit 21 possesses a function of implementing a function selected by the reliability judgment unit 18 and the function-switching judgment unit 22 with the use of the recognition result by the object detection unit.

In the in-vehicle system 1 configured as described above, as explained earlier, at the time of the normal operation, the running-route guidance map is displayed on the display 13 by the navigation program executed by the CPU 6 of the running-environment recognition apparatus 2. Furthermore, if there occurs a necessity for switching the function of assisting the driving so that the vehicle will not collide with a surrounding object, a message notifying a report to the effect is displayed on the display 13 in a superposed manner. Simultaneously, a warning sound is generated from the speaker 14, thereby notifying the driver of the vehicle about the report to the effect.

FIG. 26 illustrates a processing flowchart by the running-environment recognition apparatus 2 for implementing the function for assisting the vehicle so that the vehicle will not collide with an object in the surroundings.

A series of processings illustrated in FIG. 26 are started when the ignition switch 8 is turned ON, and are repeated until the ignition switch 8 is turned OFF. The processings will be carried out regardless of whether the vehicle is running or at a stop, or whether the image displayed on the display 13 is the running-route guidance map or the backward image or the like.

First, if the ignition switch 8 is turned ON, the running-environment recognition apparatus 2 executes the driving assistance program and the navigation program, then monitoring whether or not a driving-assistance-system activation switch 32 is ON (step 301). Moreover, when the driving-assistance-system activation switch 32 is turned ON, the frontward images, backward images, and side images are photographed by the in-vehicle camera 3a, the in-vehicle camera 3b, the in-vehicle camera 3c, and the in-vehicle camera 3d respectively, then being grabbed and stored into the RAM 5 of the running-environment recognition apparatus 2. Then, the image processing unit 16 performs the processing of detecting halation, water droplet, dirt, and rainfall state and occurrence of mist with respect to each of the photographed images grabbed into the RAM 5 (step 302). Next, at a step 302a, a judgment is made regarding reliability of the detection result of the rainfall state and occurrence of mist.

FIG. 27 illustrates contents at the step 302a in FIG. 26. First, it is judged whether or not the number of the photographed images where the rainfall state is detected is larger than n (step 313). (n is a criterion of the number of still images shot by the cameras.) If the number is equal to or larger than n, a rainfall detection flag is turned ON (step 314). Meanwhile, if the number is smaller than n, the rainfall detection flag is turned OFF (step 317). Similarly, it is judged whether or not the number of the photographed images where the mist is detected is equal to or larger than n (step 315). If the number is equal to or larger than n, a mist detection flag is turned ON (step 316). Meanwhile, if the number is smaller than n, the mist detection flag is turned OFF (step 318). In this way, the recognition processing of the photographing environment is not only applied to the respective photographed images independently, but also the respective recognition results are combined with each other. This processing makes it possible to obtain a high recognition accuracy.

Next, it is judged from the recognition result of the photographing environment whether or not continuing the image recognition processing is possible (step 303). If, e.g., water droplet or dirt is detected in all the in-vehicle cameras by the image processing unit 16, it is judged that continuing the image recognition processing is impossible. Also, if the rainfall detection flag or mist detection flag is ON, it is judged that continuing the image recognition processing is impossible. Meanwhile, if continuing the image recognition processing is possible, the to-be-processed image determination unit 17 determines an image and an image area in which the image recognition processing is to be executed (step 304). This determination is performed based on the photographing environment recognized at the step 302a, and the area in which the halation occurs and the area to which the water-droplet/dirt adheres. Next, a driving assistance function which is executable in the driving assistance system is selected (step 305).

Meanwhile, if continuing the image recognition processing is impossible, it is judged whether or not the present point-in-time is a termination timing for the driving assistance system, or it is judged whether or not the forced termination is necessary (step 310). Then, if the driving assistance system is to be terminated, the driver is notified of a report to the effect and a cause for the termination (step 311). Simultaneously, the termination processing is performed (step 312). This report allows the driver of the vehicle to recognize that the driving assistance system does not operate normally. Accordingly, the driver finds it possible to properly deal with this situation, e.g., eliminating the water-droplet/dirt adhering to the lenses. In the in-vehicle system 31 to which the present invention is applied, it is periodically judged whether or not recovery of the driving assistance system is made possible by the running-environment recognition apparatus 2 until the ignition switch 8 is turned OFF. Also, if it is judged that the present point-in-time is not the termination timing, and that the forced termination is unnecessary, the processing proceeds to the processing at the step 305.

At the step 305, the driving assistance function is selected based on a combination in which the halation, water droplet, or the like is recognized to exist. Here, the halation, water droplet, or the like is detected by the image processing unit 16 from the images photographed by the in-vehicle camera 3a, the in-vehicle camera 3b, the in-vehicle camera 3c, and the in-vehicle camera 3d. FIG. 28 illustrates examples of the driving assistance functions to be selected at the step 305 in FIG. 26. Furthermore, if the selection result of the driving assistance function differs from the previous frame, it is judged whether or not the present point-in-time is a to-be-processed image switching timing (step 306).

If it is judged that the present point-in-time is the function switching timing, a processing for switching the function is performed (step 307), then performing an object detection processing (step 308). Meanwhile, if it is judged that the present point-in-time is not the function switching timing, the object detection processing is performed without performing the function switching processing (step 308).

From data such as position of the object on the image determined by the above-described processing, and relative velocity of the object relative to the vehicle, the control/warning unit performs the steering control or the brake assistance so that the vehicle will not collide with the object in the vehicle's surroundings. Otherwise, the control/warning unit notifies the driver of a report to the effect that there is a danger of the vehicle's colliding with the object (step 309).

Like the in-vehicle system 31 according to the present embodiment, depending on the situation of sensors for recognizing an object in the vehicle's surroundings, it is changed whether or not to execute the steering control, brake assistance, and warning. This change makes it possible to reduce a false operation of the system, and to assist the driving under an environment in which the conventional driving assistance systems cannot be operated.

Embodiment 4

Referring to the drawings, the explanation will be given below concerning a fourth embodiment.

Figure 29:
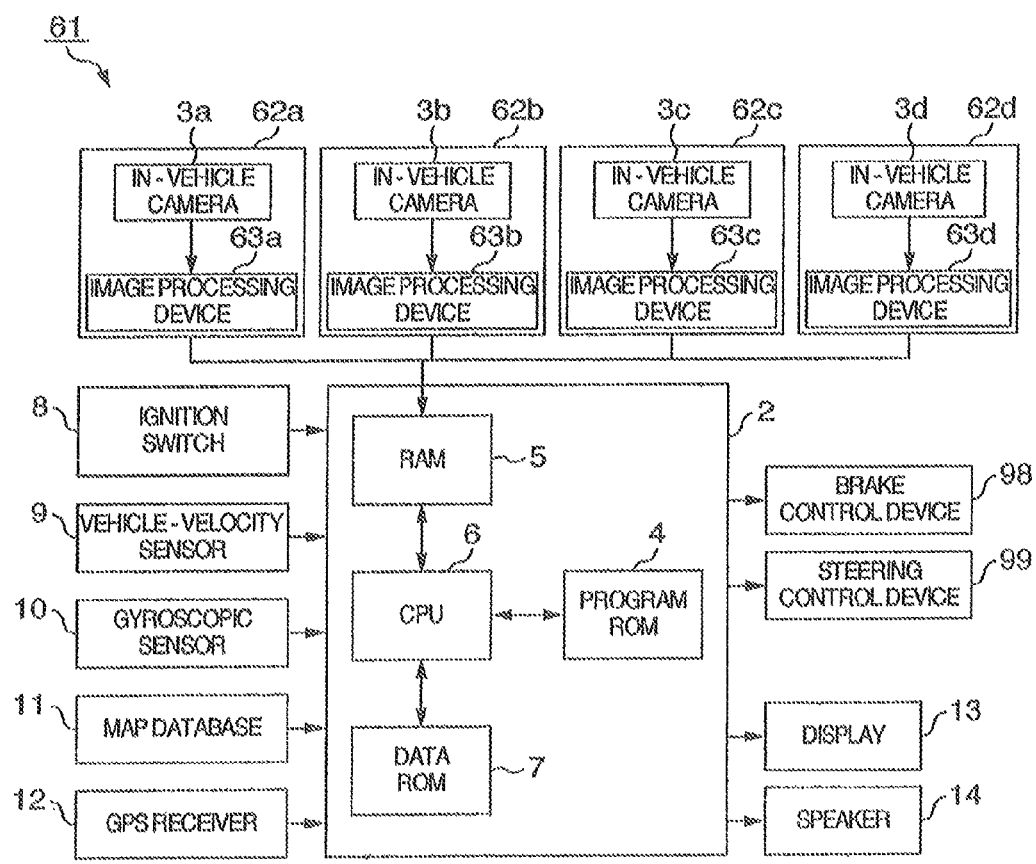
FIG. 29 illustrates a block configuration diagram of an in-vehicle system 61 which embodies a fourth embodiment.

FIG. 29 illustrates a functional block diagram of an in-vehicle system 61 which embodies the fourth embodiment. Incidentally, with respect to the configuration of the in-vehicle system 61 of the present embodiment, the same reference numerals will be affixed to basically the same configuration components in the drawings, and the overlapped explanation thereof will be omitted.

The present embodiment is capable of implementing functions which are similar to the ones in the third embodiment. With respect to the first and second embodiments, similarly, respective in-vehicle camera units may possess the image processing function like the in-vehicle system 61.

Figure 30:
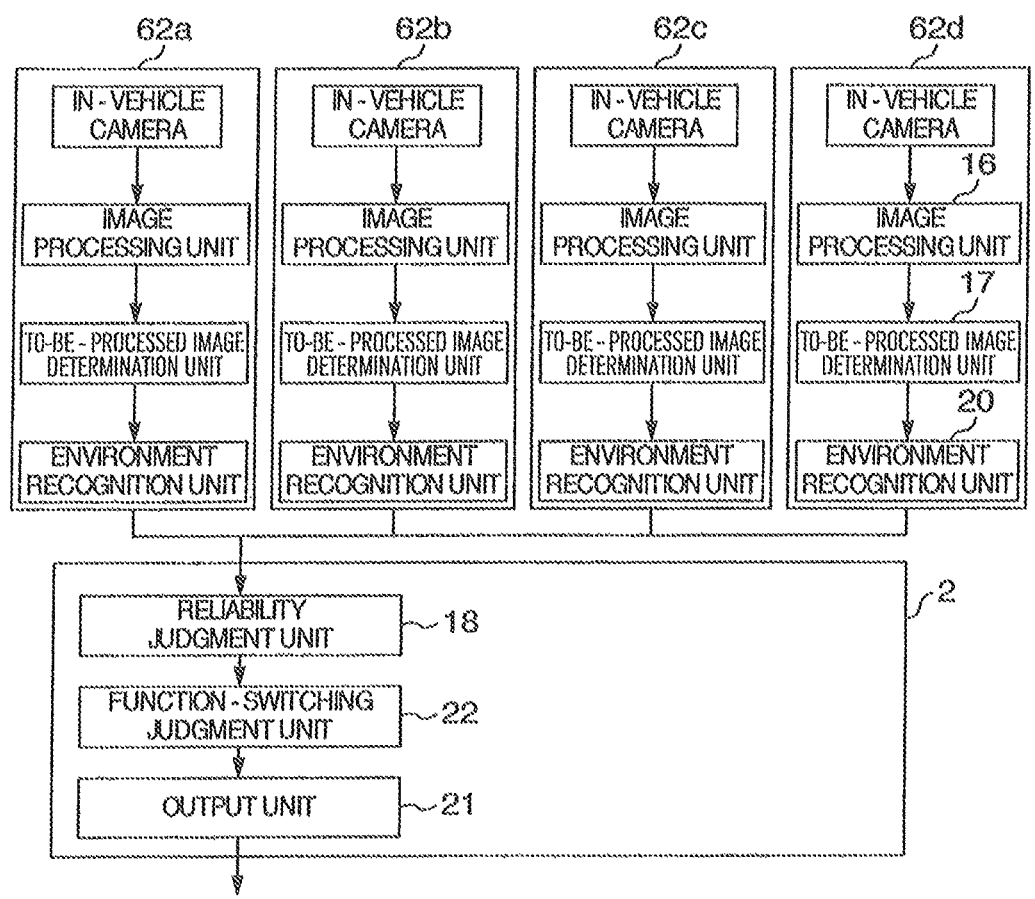
FIG. 30 illustrates a functional block diagram of FIG. 29.

FIG. 30 illustrates a functional block diagram of FIG. 29.

Unlike the running-environment recognition apparatus 2 which includes the image processing unit 16, the to-be-processed image determination unit 17, and the environment recognition unit 20 included in the in-vehicle system 31 of the third embodiment, this in-vehicle system 61 includes an in-vehicle camera unit 62a, an in-vehicle camera unit 62b, an in-vehicle camera unit 62c, and an in-vehicle camera unit 62d, respectively. Moreover, using the image processing unit 16, each in-vehicle camera unit detects halation, water droplet, and dirt with respect to each image photographed by each in-vehicle camera unit. Furthermore, the environment recognition processing is performed inside each in-vehicle camera unit. In addition, these detection result and recognition result are transmitted to the running-environment recognition apparatus 2. Then, based on the information, the running-environment recognition apparatus 2 performs the selection of a driving assistance function, the judgment on the function switching timing, and the control and warning to the driver.

Figure 31:
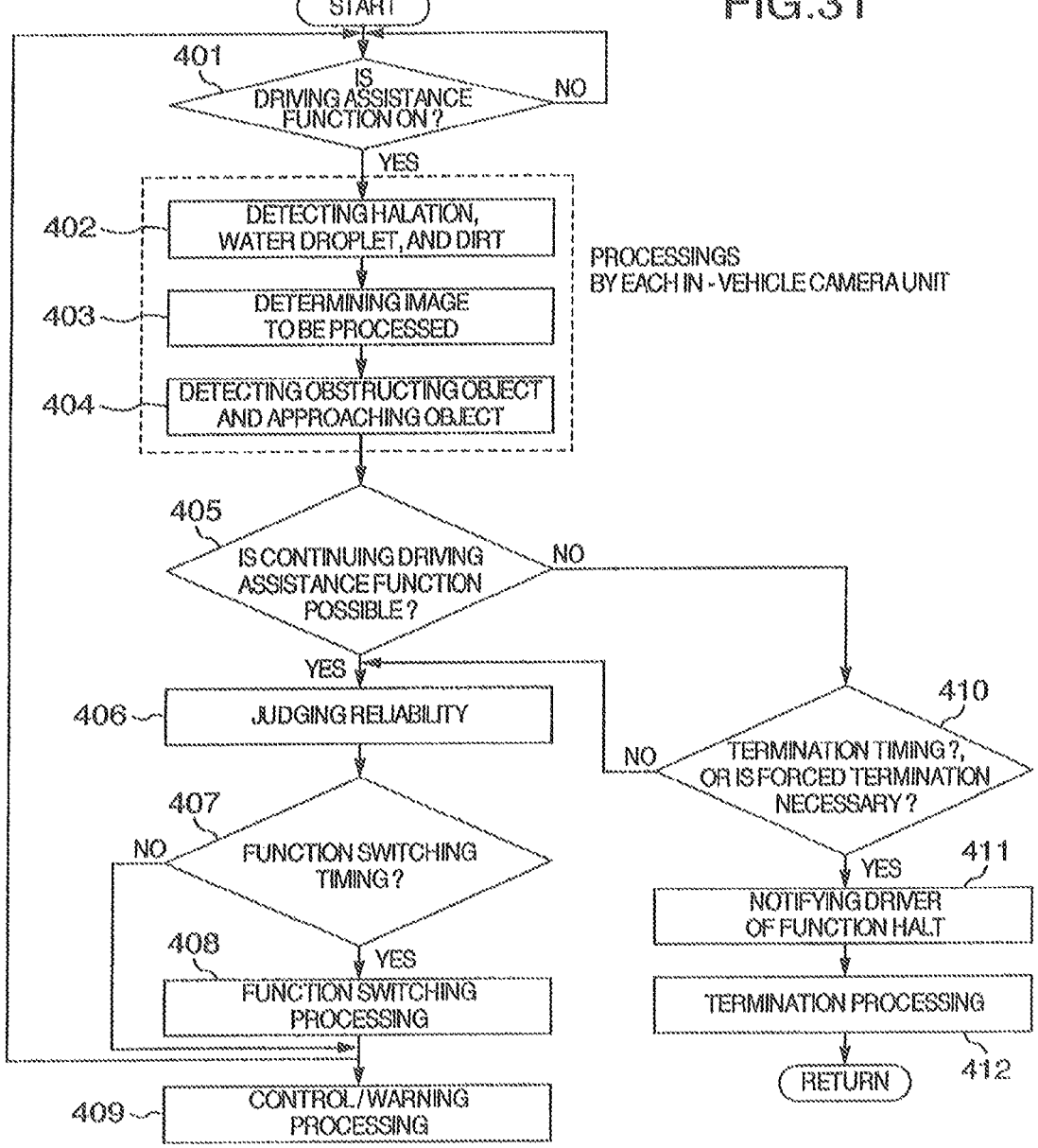
FIG. 31 illustrates a control flowchart for the fourth embodiment.

FIG. 31 illustrates a processing flowchart of the fourth embodiment.

FIG. 31 illustrates a series of processing flow performed by each in-vehicle camera unit and the running-environment recognition apparatus 2 in the in-vehicle system 61. The series of processings illustrated in FIG. 31 are started when the ignition switch 8 is turned ON, and are repeated until the ignition switch 8 is turned OFF. The processings will be carried out regardless of whether the vehicle is running or at a stop, or whether the image displayed on the display 13 is the running-route guidance map or an image such as rearview image.

First, if the ignition switch 8 is turned ON, the running-environment recognition apparatus 2 executes the driving assistance program and the navigation program, and each in-vehicle camera unit executes the object detection program. The driving assistance program monitors whether or not the driving-assistance-system activation switch 32 is ON. When the switch 32 is turned ON, each in-vehicle camera unit is notified of a report to the effect (step 401). Moreover, when the driving-assistance-system activation switch 32 is turned ON, the frontward images, backward images, and side images are photographed by the in-vehicle camera 3a, the in-vehicle camera 3b, the in-vehicle camera 3c, and the in-vehicle camera 3d respectively, then being grabbed and stored into each in-vehicle camera unit. Then, the image processing unit 16 performs the processing of detecting halation, water droplet, and dirt with respect to each of the photographed images grabbed therein (step 402). The to-be-processed image determination unit 17 judges whether or not each photographed image is processible inside each in-vehicle camera unit (step 403). Furthermore, the object detection unit detects an object within each photographed image (step 404).

Next, from the photographing-environment recognition result stored into each in-vehicle camera unit, it is judged whether or not the running-environment recognition apparatus 2 is capable of continuing the image recognition processing (step 405). If, e.g., water droplet or dirt is detected in all the in-vehicle cameras by the image processing unit 16, it is judged that continuing the image recognition processing is impossible. Meanwhile, if continuing the image recognition processing is possible, the function selection unit selects a driving assistance function which is executable in the driving assistance system (step 406). This selection is performed based on the photographing environment recognized at the step 402, and the area in which the halation occurs and the area to which the water-droplet/dirt adheres.

Meanwhile, if continuing the image recognition processing is impossible, it is judged whether or not the present point-in-time is a termination timing for the driving assistance system, or it is judged whether or not the forced termination is necessary (step 410). Then, if the driving assistance system is to be terminated, the driver is notified of a report to the effect and a cause for the termination (step 411). Simultaneously, the termination processing is performed (step 412). Also, if it is judged that the present point-in-time is not the termination timing, and that the forced termination is unnecessary, the processing proceeds to the processing at the step 406.

At the step 406, the driving assistance function is selected based on a combination in which the halation, water droplet, or the like is recognized to exist. Here, the halation, water droplet, or the like is detected by the image processing unit 16 from the images photographed by the in-vehicle camera 3a, the in-vehicle camera 3b, the in-vehicle camera 3c, and the in-vehicle camera 3d.

Furthermore, if the selection result of the driving assistance function differs from the previous frame, it is judged whether or not the present point-in-time is a function switching timing (step 407).

If it is judged that the present point-in-time is the function switching timing, a processing for switching the function is performed (step 408). Meanwhile, if it is judged that the present point-in-time is not the function switching timing, the processing for switching the function is not performed.

From data such as position of the object on the image determined by the above-described processing, and relative velocity of the object relative to the vehicle, the control/warning unit performs the steering control or the brake assistance so that the vehicle will not collide with the object in the vehicle's surroundings. Otherwise, the control/warning unit notifies the driver of a report to the effect that there is a danger of the vehicle's colliding with the object (step 409).

As is the case with the above-described in-vehicle system 61 according to the fourth embodiment, even if each in-vehicle camera unit includes the image processing device therein, it is also possible to obtain basically the same effects as the ones when the image recognition processing is performed by inputting images into the control unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An in-vehicle running-environment recognition apparatus, comprising:
   an input unit for inputting an image signal transmitted from an in-vehicle imaging device for photographing external environment of a vehicle;
   an image processing unit for detecting a first image area by processing the image signal inputted via the input unit, the first image area having a factor which prevents recognition of the external environment of the vehicle;
   a to-be-processed image determination unit for determining that an environment recognition processing is possible in a case that a size and a position of the first image area in the inputted image signal by the image processing unit are less than predetermined threshold values, and determining a second image area based on the size and position of the first image area; and
   an environment recognition unit for recognizing the external environment of the vehicle based on the second image area determined by the to-be-processed image determination unit.

2. The in-vehicle running-environment recognition apparatus according to claim 1, further comprising an output unit for determining a control signal for the vehicle based on a recognition result by the environment recognition unit, and outputting the control signal.

3. The in-vehicle running-environment recognition apparatus according to claim 1, further comprising a switching judgment unit for judging whether or not the second image area should be switched to a new second image area if the to-be-processed image determination unit determines that the second image area is changed.

4. The in-vehicle running-environment recognition apparatus according to claim 3, wherein
   the input unit inputs the signal transmitted from a navigation system and a map database mounted on the vehicle;
   the switching judgment unit judges whether or not a route guidance based on the signal is under execution by the navigation system; and
   if the route guidance is under execution, the switching judgment unit acquires route information on a route along which the vehicle will travel in the future, and predicts a time during which the photographing environment can change from the route information and map information acquired from the map database; wherein
   if the route guidance is not under execution, the switching judgment unit calculates a distance from a present position to the nearest curve or intersection from the present position and the map data, and predicts the time during which the photographing environment will change from the calculated distance and a vehicle's velocity, the second image area is maintained if the predicted time is smaller than a predetermined value, and the processing target is switched to the new second image area if the predicted time is larger than the predetermined value.

5. The in-vehicle running-environment recognition apparatus according to claim 3, wherein
   the switching judgment unit judges whether or not a control is exercised over steering or braking, and the second image area is maintained if the control is under execution; and
   the processing target is switched to the new second image area if the control is not under execution.

6. The in-vehicle running-environment recognition apparatus according to claim 1, wherein
   the to-be-processed image determination unit switches over a method of the environment recognition processing based on a size and a position of the first image area detected by the image processing unit, and
   the environment recognition unit recognizes the external environment of the vehicle based on the method of the environment recognition processing.

7. The in-vehicle running-environment recognition apparatus according to claim 6, further comprising a switching judgment unit for judging whether or not the method of the environment recognition processing should be switched to new method of the environment recognition processing if the new method of the environment recognition processing determined by the to-be-processed image determination unit is different from former method of the environment recognition processing.

8. The in-vehicle running-environment recognition apparatus according to claim 2, wherein
   the external environment includes a lane mark, and
   when the environment recognition unit recognizes one of a pair of lane marks of a traffic lane on which the vehicle is running, the output unit estimates a central line based on the one lane mark and a predetermined width of the traffic lane and calculates a control signal based on the estimated central line, and outputs the control signal.

* * * * *